US010439550B1

(12) United States Patent
Goodman

(10) Patent No.: US 10,439,550 B1
(45) Date of Patent: Oct. 8, 2019

(54) SYSTEM AND METHOD FOR POSITIONING SOLAR PANELS WITH AUTOMATED DRONES

(71) Applicant: Sebastian Goodman, Venice, CA (US)

(72) Inventor: Sebastian Goodman, Venice, CA (US)

( * ) Notice: Subject to any disclaimer, the term of this patent is extended or adjusted under 35 U.S.C. 154(b) by 0 days.

(21) Appl. No.: 16/134,905

(22) Filed: Sep. 18, 2018

(51) Int. Cl.
| | | |
|---|---|---|
| *H02S 20/32* | (2014.01) |
| *B64C 39/02* | (2006.01) |
| *F16M 11/12* | (2006.01) |
| *B64D 45/08* | (2006.01) |
| *G06K 7/14* | (2006.01) |
| *G06K 7/10* | (2006.01) |
| *F16M 11/04* | (2006.01) |

(52) U.S. Cl.
CPC ............ *H02S 20/32* (2014.12); *B64C 39/024* (2013.01); *B64D 45/08* (2013.01); *F16M 11/046* (2013.01); *F16M 11/126* (2013.01); *G06K 7/10722* (2013.01); *G06K 7/1417* (2013.01); *B64C 2201/12* (2013.01)

(58) Field of Classification Search
CPC ............ B64C 2201/12; B64C 2201/18; B64C 39/024; B64F 1/02; B64F 1/12; B64F 1/22; B64F 1/222; H02S 20/30; H02S 20/32; F24S 50/20
See application file for complete search history.

(56) References Cited

U.S. PATENT DOCUMENTS

| | | | | |
|---|---|---|---|---|
| 4,018,409 A | * | 4/1977 | Burch .................... | B64G 1/646 213/81 |
| 4,275,711 A | * | 6/1981 | Dumbeck ............... | F24S 40/20 126/603 |
| 4,345,582 A | | 8/1982 | Aharon | |
| 4,867,611 A | * | 9/1989 | Luyties ................. | E02B 17/027 405/209 |
| 4,897,014 A | * | 1/1990 | Tietze .................. | B25J 15/0206 279/2.23 |
| 8,536,504 B2 | | 9/2013 | Kats | |
| 8,590,828 B2 | * | 11/2013 | Marcus ............... | B64C 29/0058 244/1 R |

(Continued)

OTHER PUBLICATIONS

Wikipedia, "Horizontal coordinate system", https://en.wikipedia.org/wiki/Horizontal_coordinate_system, accessed 12/213/2018 (Year: 2018).*

*Primary Examiner* — Philip J Bonzell
*Assistant Examiner* — Alexander V. Giczy
(74) *Attorney, Agent, or Firm* — Jafari Law Group, Inc.

(57) ABSTRACT

Using a programmable aerial drone assembly configured to actuate a gearbox that repositions one or more solar panels, automated drones may be deployed to adjust the position of the solar panels throughout the day according to a programmable schedule. In exemplary embodiments, a plurality of docking stations may be deployed throughout a solar farm, such that one or more solar panels are mechanically coupled to the docking station, wherein the docking station includes a landing platform and a gearbox mechanically configured to adjust the position of the solar panels. One or more gearbox arms protrude from the top of the docking station landing platform, and corresponding arms on the aerial drone assembly engage the gearbox arms to actuate the gearbox. The aerial drone assembly also includes landing posts that register with the docking station.

14 Claims, 17 Drawing Sheets

(56) References Cited

U.S. PATENT DOCUMENTS

| | | | |
|---|---|---|---|
| 8,662,438 B2 | 3/2014 | Savoye | |
| 8,881,720 B2* | 11/2014 | Currier | F24S 23/77 |
| | | | 126/607 |
| 9,056,676 B1 | 1/2015 | Wang | |
| 8,976,340 B2 | 3/2015 | Gilliland | |
| 9,020,636 B2 | 4/2015 | Tadayon | |
| 9,599,281 B1 | 3/2017 | Lish | |
| 9,882,067 B2 | 1/2018 | Britcher | |
| 2009/0050750 A1* | 2/2009 | Goossen | B64C 39/024 |
| | | | 244/76 R |
| 2009/0223510 A1* | 9/2009 | Larsen | F22B 1/006 |
| | | | 126/694 |
| 2009/0320827 A1 | 12/2009 | Thompson | |
| 2010/0307479 A1 | 12/2010 | Park | |
| 2011/0023864 A1 | 2/2011 | Andretich | |
| 2011/0049992 A1 | 3/2011 | Sant'Anselmo | |
| 2012/0012101 A1* | 1/2012 | Trujillo | F24S 30/452 |
| | | | 126/601 |
| 2013/0133172 A1 | 5/2013 | Kiener | |
| 2014/0360552 A1 | 12/2014 | Britcher | |
| 2016/0033966 A1 | 2/2016 | Farris | |
| 2016/0122038 A1* | 5/2016 | Fleischman | G06T 7/73 |
| | | | 701/2 |
| 2016/0159496 A1 | 6/2016 | O'Toole | |
| 2016/0362173 A1 | 12/2016 | Marion | |
| 2016/0376031 A1* | 12/2016 | Michalski | B64F 1/36 |
| | | | 701/15 |
| 2017/0032686 A1* | 2/2017 | Alonso Tabares | G08G 5/0091 |
| 2017/0154536 A1 | 6/2017 | Kreiner | |
| 2017/0203857 A1 | 7/2017 | O'Toole | |
| 2017/0210470 A1 | 7/2017 | Pardell | |
| 2017/0217323 A1* | 8/2017 | Antonini | B64C 25/52 |
| 2017/0227965 A1* | 8/2017 | Decenzo | H04L 67/025 |
| 2017/0261975 A1* | 9/2017 | Liu | H04B 10/116 |
| 2017/0275025 A1 | 9/2017 | Johnson | |
| 2017/0313470 A1 | 11/2017 | Britcher | |
| 2017/0328391 A1 | 11/2017 | Matsuda | |
| 2018/0017658 A1* | 1/2018 | Wu | H02S 20/32 |
| 2018/0035606 A1 | 2/2018 | Burdoucci | |
| 2018/0053139 A1* | 2/2018 | Stoman | G06Q 10/083 |
| 2018/0054156 A1* | 2/2018 | Lokey | H02S 20/32 |
| 2018/0072416 A1* | 3/2018 | Cantrell | B64C 39/024 |
| 2018/0074523 A1* | 3/2018 | Cantrell | G05D 1/104 |
| 2018/0075760 A1* | 3/2018 | Thompson | H02J 50/20 |
| 2018/0086452 A1* | 3/2018 | Hunt | G06Q 10/0835 |
| 2018/0101173 A1 | 4/2018 | Banerjee | |
| 2018/0173245 A1* | 6/2018 | Twining | B64D 45/00 |
| 2018/0208310 A1* | 7/2018 | Boyk | H02J 7/35 |
| 2018/0257774 A1* | 9/2018 | Volpi | B25J 11/00 |
| 2018/0312023 A1* | 11/2018 | Braithwaite | B29C 64/165 |

* cited by examiner

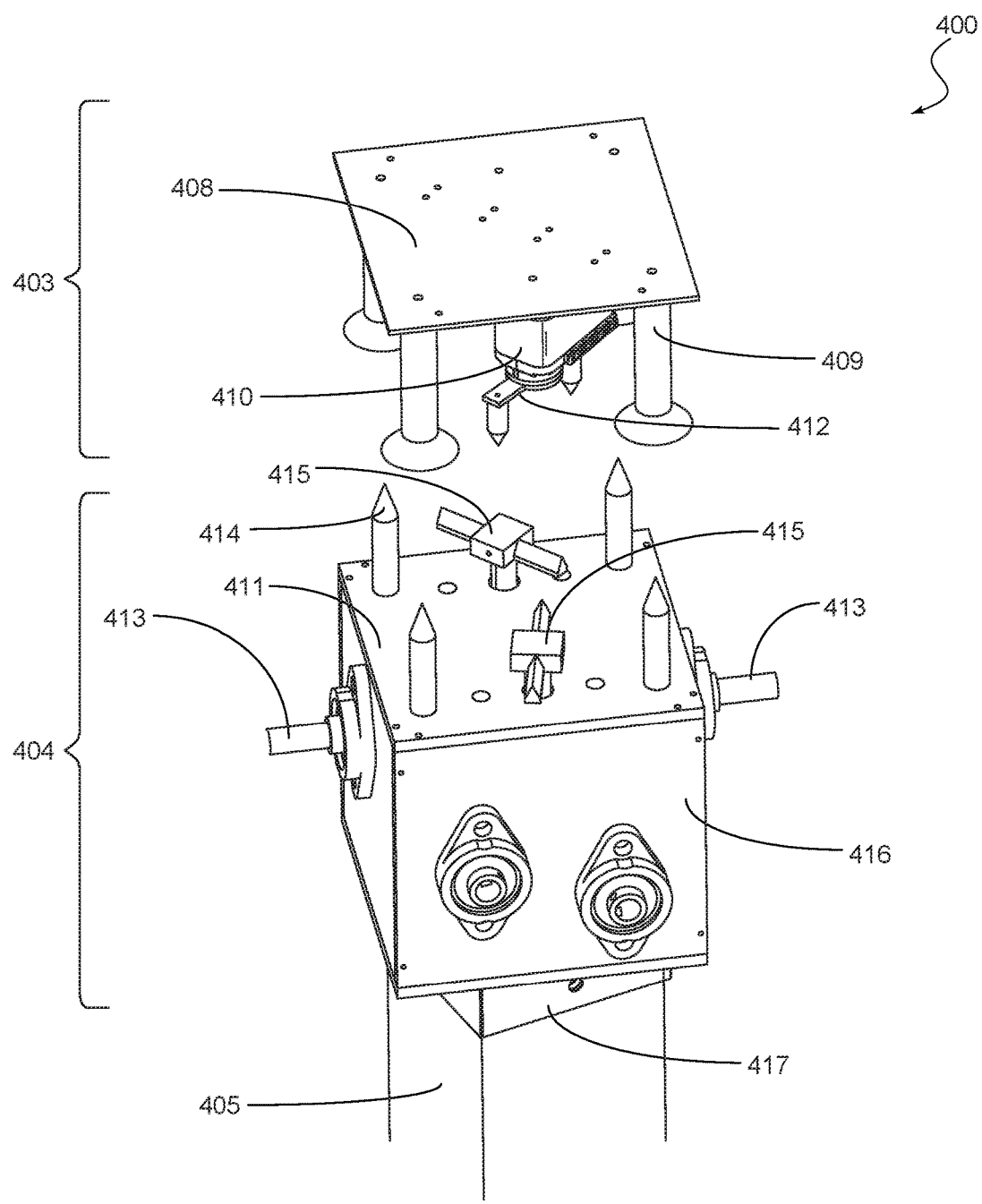

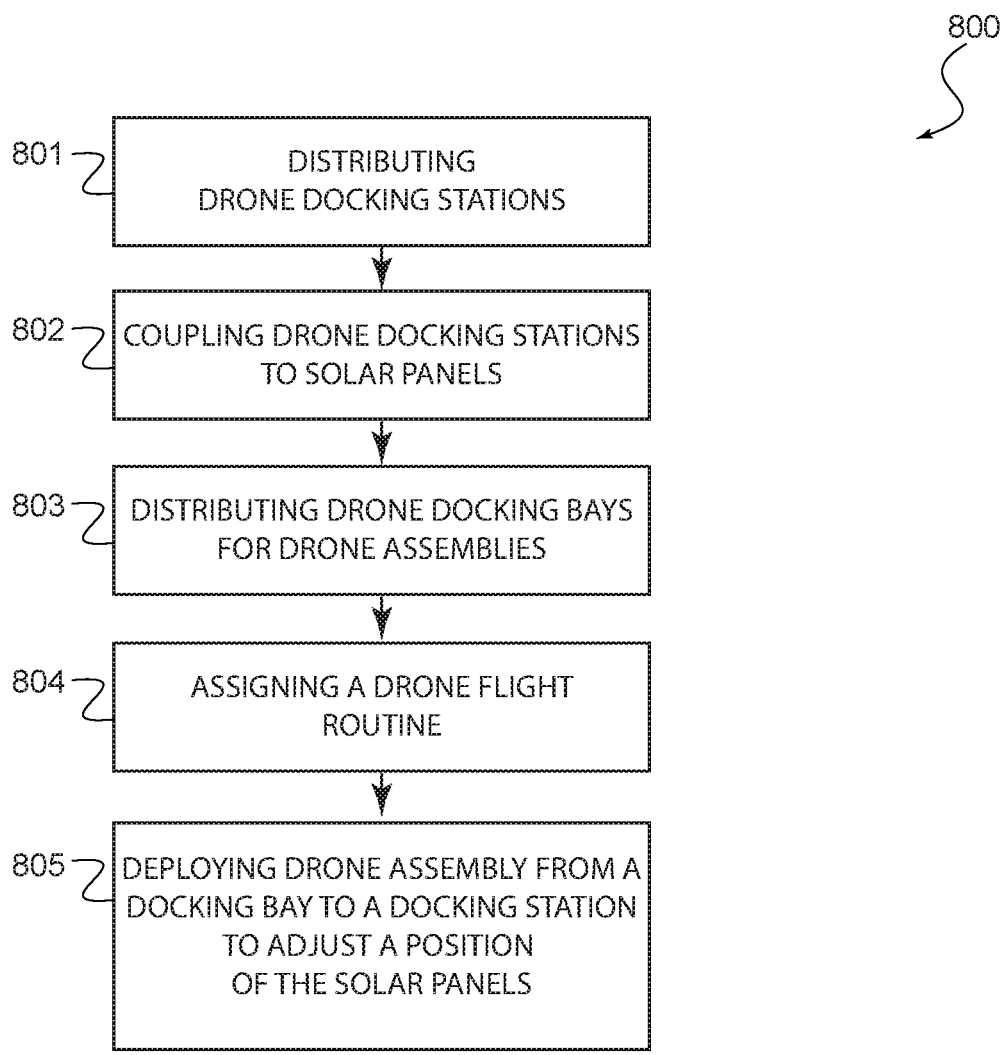

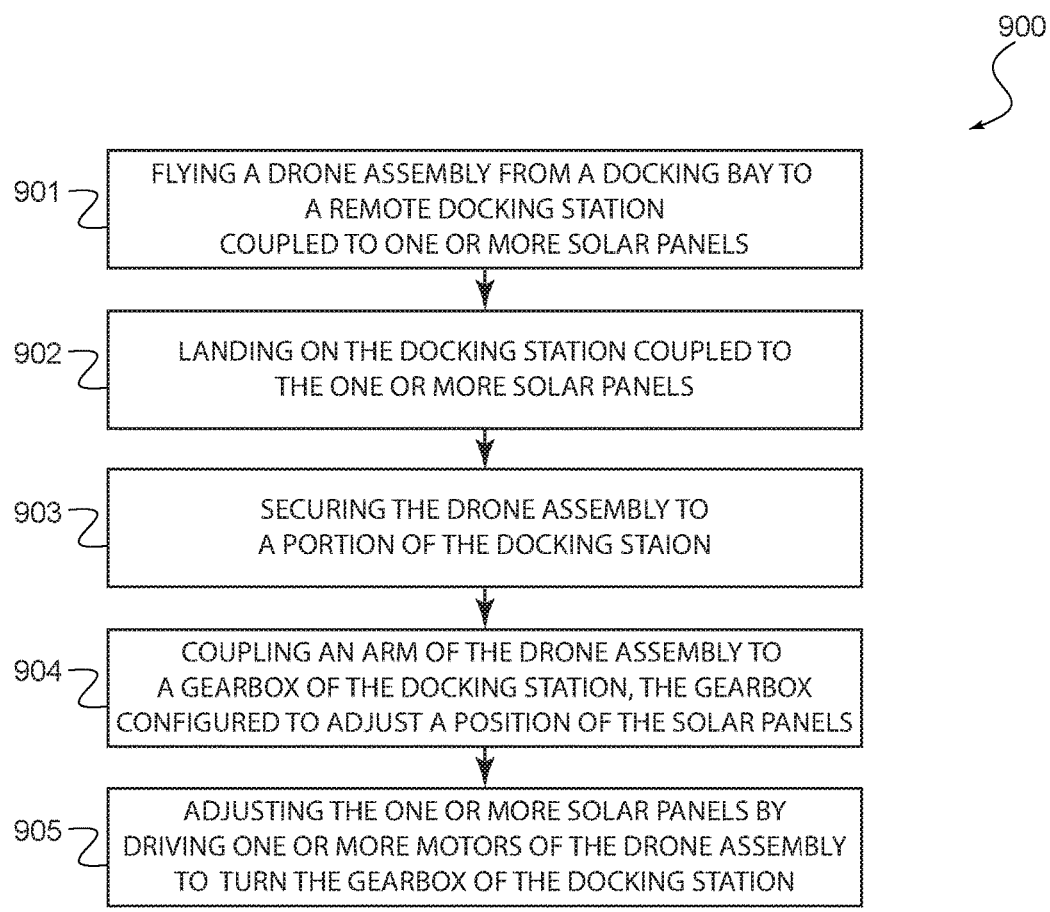

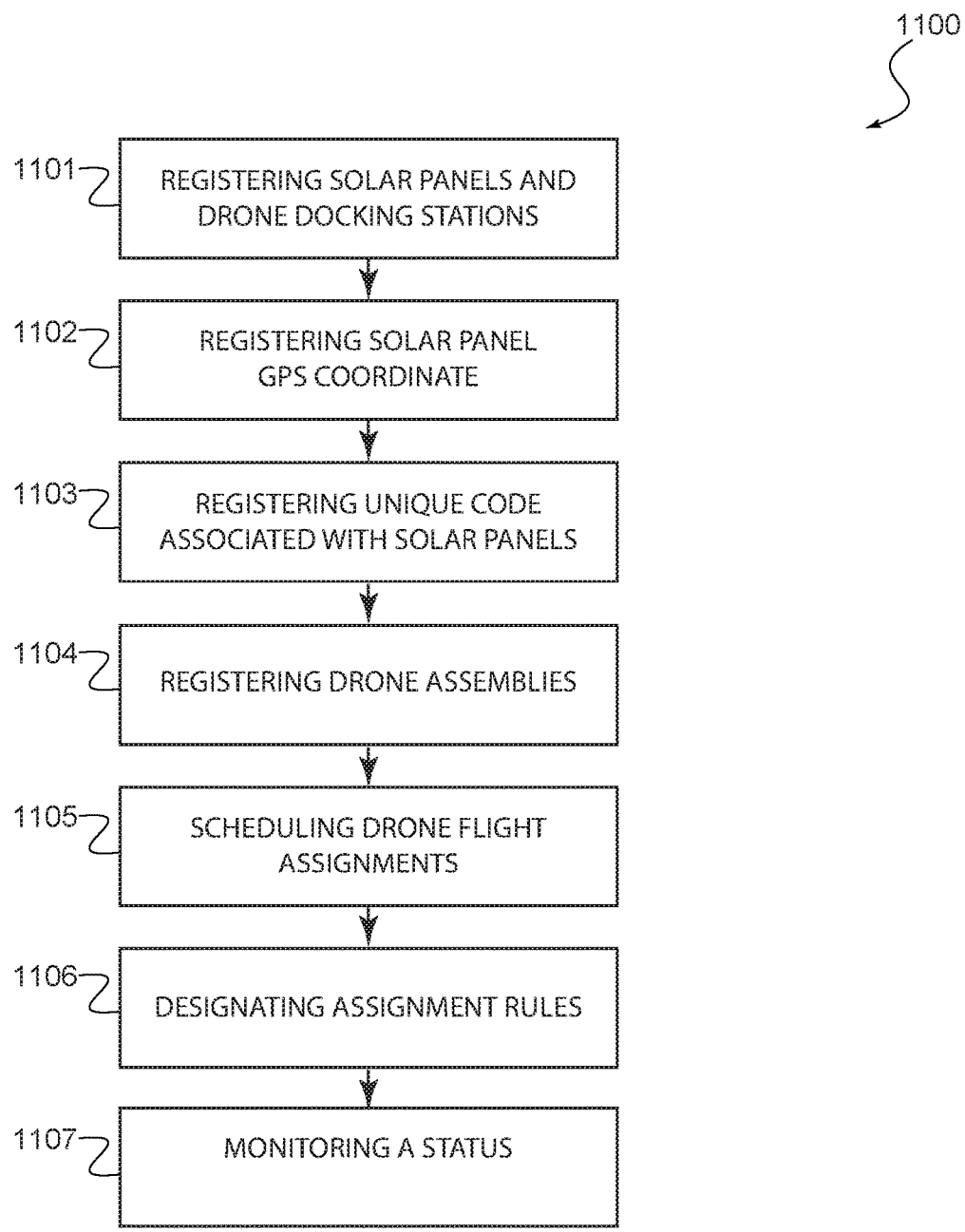

SYSTEM AND METHOD FOR POSITIONING SOLAR PANELS WITH AUTOMATED DRONES

TECHNICAL FIELD OF THE INVENTION

The present invention is generally directed to the utilization of drones in solar farms, and more specifically, to a system and method for automating control of solar panels utilizing a programmable aerial drone assembly configured to adjust the position of one or more solar panels in a solar farm.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Drones have been around for some time and more recently have been implemented in solar farms for a variety of tasks. Several teachings focus on drones configured to take over duties that are normally performed by a solar farm personnel such as maintenance, installations, and other less typical solar farm operations. Some disclosures discuss drones configured to dock on top of solar panels to facilitate cleaning procedures of photovoltaic cells. Other disclosures discuss drones configured to travel along tracks to reach their destination and accomplish programmable tasks.

For example, one such system is taught by U.S. Pat. No. 9,882,067 to Britcher (Britcher). Britcher describes a system for transporting and installing large photovoltaic modules, and more particularly, a photovoltaic module handling system that does not require a conveyance vehicle to travel along the ground and that enables substantially automated replenishment of photovoltaic modules in a solar panel array. Another such system is taught by U.S. Patent Application Publication 2017/0210470 to Pardell (Pardell). Pardell describes a drone system including a corresponding docking station on surfaces such as a glass surface of the photovoltaic cells or solar panels, wherein the drone is configured to clean the surface with a cleaning device. While these systems seek to use drones for facilitating certain tasks in solar farms, these prior teachings do not address the problem common to all solar farms of maximizing a solar panel position throughout the day so that a maximum exposure of the photovoltaic cells to available solar energy is ensured.

U.S. Pat. No. 9,020,636 to Tadayon (Tadayon), on the other hand discloses a robot for solar farms, which addresses changing an angle of a solar panel using a myriad of complex spherical joints/hinges, lifter(s)/jacks, gears, angle adjusters, engaging mechanisms, motor(s), tracks, and a tracking mechanism. Accordingly, although Tadayon describes using a robot for various functions including for lowering or changing a slope or angle of solar panels, that system requires generally prohibitively expensive equipment, complex installation, and impliedly complex maintenance. Such complexity is impractical for implementation by ordinary solar farms. That system requires increased energy consumption (for installation and running of the robots necessary to facilitate the same), and as such is inefficient. Moreover, and for similar reasons, presently existing systems may not be easily retrofitted to meet the Tadayon specifications.

Therefore, there exists an inadequately addressed need for a system and method that autonomously positions solar panels to maximize solar exposure, which: is easy to install and does away with complex panel positioning systems common in the art; is autonomous and efficient; and includes easily retrofittable components that may be adapted by existing solar farms.

It is to these ends that the present invention has been developed.

SUMMARY OF THE INVENTION

To minimize the limitations in the prior art, and to minimize other limitations that will be apparent upon reading and understanding the present specification, the present invention describes a system and method of automating control of solar panel positions or orientations.

Generally, the present invention concerns a system and method for automating the positioning of solar panels in a solar farm to maximize solar energy intake. Utilizing a programmable aerial drone assembly configured to actuate a gearbox that operates a position of one or more solar panels, automated drones may be deployed to adjust the position of the solar panels throughout the day according to a programmable schedule. In exemplary embodiments, a plurality of docking stations may be deployed throughout the solar farm, such that one or more solar panels are mechanically coupled to the docking station, wherein the docking station includes a gearbox mechanically configured to adjust the position of each solar panel coupled thereto. Accordingly, one or more drone assemblies may be deployed at predetermined times throughout a scheduled period to dock with an assigned docking station and adjust the position of the one or more solar panels.

In some exemplary embodiments, a prior art drone may be retrofitted with a drone attachment suitable for the objectives of the present invention. In some exemplary embodiments, an automated drone management system may include a central server for remotely managing a plurality of drones and or solar panels. In some exemplary embodiments, drones may employ image recognition technologies for implementation of unique identifiers such as barcodes, or Quick Response (QR™) codes, or the like to assist drones in identification or orientation with respect to assigned solar panels. In some exemplary embodiments, auxiliary components such as docking bays for recharging, storage, and uploading information to the central server may be implemented. In some exemplary embodiments, perimeter weather sensors may also be distributed throughout the solar farm to assist in setting deployment rules depending on suitable weather conditions.

An aerial drone assembly for controlling a position of a solar panel, in accordance with exemplary embodiments of the present invention, may include: one or more landing posts secured to a frame, at least one of the one or more landing posts configured to register with a docking station, the docking station including a gearbox mechanically coupled to one or more solar panels; one or more arms coupled to one or more motors secured to the frame, the one or more arms configured to actuate the gearbox of the docking station; and a control circuitry for supplying power to the one or more motors, the control circuitry configured to: fly the aerial drone assembly to the docking station; land the aerial drone assembly on a platform of the docking station such that at least one of the one or more landing posts registers with a docking post of the docking station and the one or more arms engage with a gearbox arm of the docking station; and adjust a position of the one or more solar panels by actuating the one or more arms.

A system for controlling a position of a solar panel, in accordance with exemplary embodiments of the present invention, may comprise: a docking station including a landing platform and a gearbox mechanically coupled to one or more solar panels; and an aerial drone assembly including: one or more landing posts secured to a frame, wherein at least one of the one or more landing posts is configured to register with the docking station; one or more arms coupled to one or more motors secured to the frame, the one or more arms configured to actuate the gearbox of the docking station; and a control circuitry for supplying power to the one or more motors, the control circuitry configured to: fly the aerial drone assembly to the docking station; land the aerial drone assembly on a platform of the docking station such that at least one of the one or more landing posts registers with a docking post of the docking station and the one or more arms engage with a gearbox arm of the docking station; and adjust a position of the one or more solar panels by actuating the one or more arms.

In some exemplary embodiments, a control circuitry of the drone assembly or a server may be configured to: determine a current azimuth and a current altitude of one or more solar panels coupled to a docking station; determine, based on a solar position algorithm, an azimuth and an altitude of the one or more solar panels; and adjust the position of the one or more solar panels to the optimum azimuth and altitude.

An method for controlling a position of a solar panel with automated aerial drone assemblies, in accordance with exemplary embodiments of the present invention, may comprise the steps of: distributing a docking station including a landing platform and a gearbox mechanically coupled to one or more solar panels; deploying an aerial drone assembly including one or more landing posts secured to a frame, wherein at least one of the one or more landing posts is configured to register with the docking station, one or more arms coupled to one or more motors secured to the frame, the one or more arms configured to actuate the gearbox of the docking station; and landing the aerial drone assembly on the landing platform of the docking station such that at least one of the one or more landing posts registers with a docking post of the docking station and the one or more arms engage with a gearbox arm of the docking station; and adjusting a position of the one or more solar panels by actuating the one or more arms of the aerial drone assembly.

Another method for controlling a position of a solar panel with automated aerial drone assemblies, in accordance with exemplary embodiments of the present invention, may comprise the steps of: flying a drone assembly from a docking bay to a remote docking station coupled to one or more solar panels, the drone assembly including: one or more landing posts secured to a frame, and one or more arms coupled to one or more motors secured to the frame, wherein at least one of the one or more landing posts is configured to register with the docking station and the one or more arms are configured to actuate a gearbox of the docking station; landing the aerial drone assembly on a landing platform of the docking station such that at least one of the one or more landing posts registers with a docking post of the docking station and the one or more arms engage with the gearbox arm of the docking station; and adjusting a position of the one or more solar panels by actuating the one or more arms of the aerial drone assembly.

It is envisioned that a system and method in accordance with the present invention will autonomously positions solar panels to maximize solar exposure. It is poised that such system is easy to install and does away with complex panel positioning systems common in the art. The autonomous nature of the system is designed to increase efficiency, and system components include easily retrofittable elements that may be easily adapted by existing solar farms.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF THE DRAWINGS

Elements in the figures have not necessarily been drawn to scale in order to enhance their clarity and improve an understanding of the various embodiments of the invention. Furthermore, elements that are known to be common and well understood to those in the industry are not always depicted in order to provide a clearer view of the various embodiments of the invention. The drawings that accompany the detailed description can be briefly described as follows:

FIG. 4C illustrates a close-up view of the drone attachment and docking station depicted in FIG. 4B.

FIG. 8 illustrates a flow chart of one method for implementing a system in accordance with exemplary embodiments of the present invention.

FIG. 9 illustrates a flow chart of one method for adjusting a solar panel position in accordance with exemplary embodiments of the present invention.

FIG. 11 illustrates a flow chart of one method for managing a system in accordance with exemplary embodiments of the present invention.

DETAILED DESCRIPTION OF THE DRAWINGS

Figure 1:
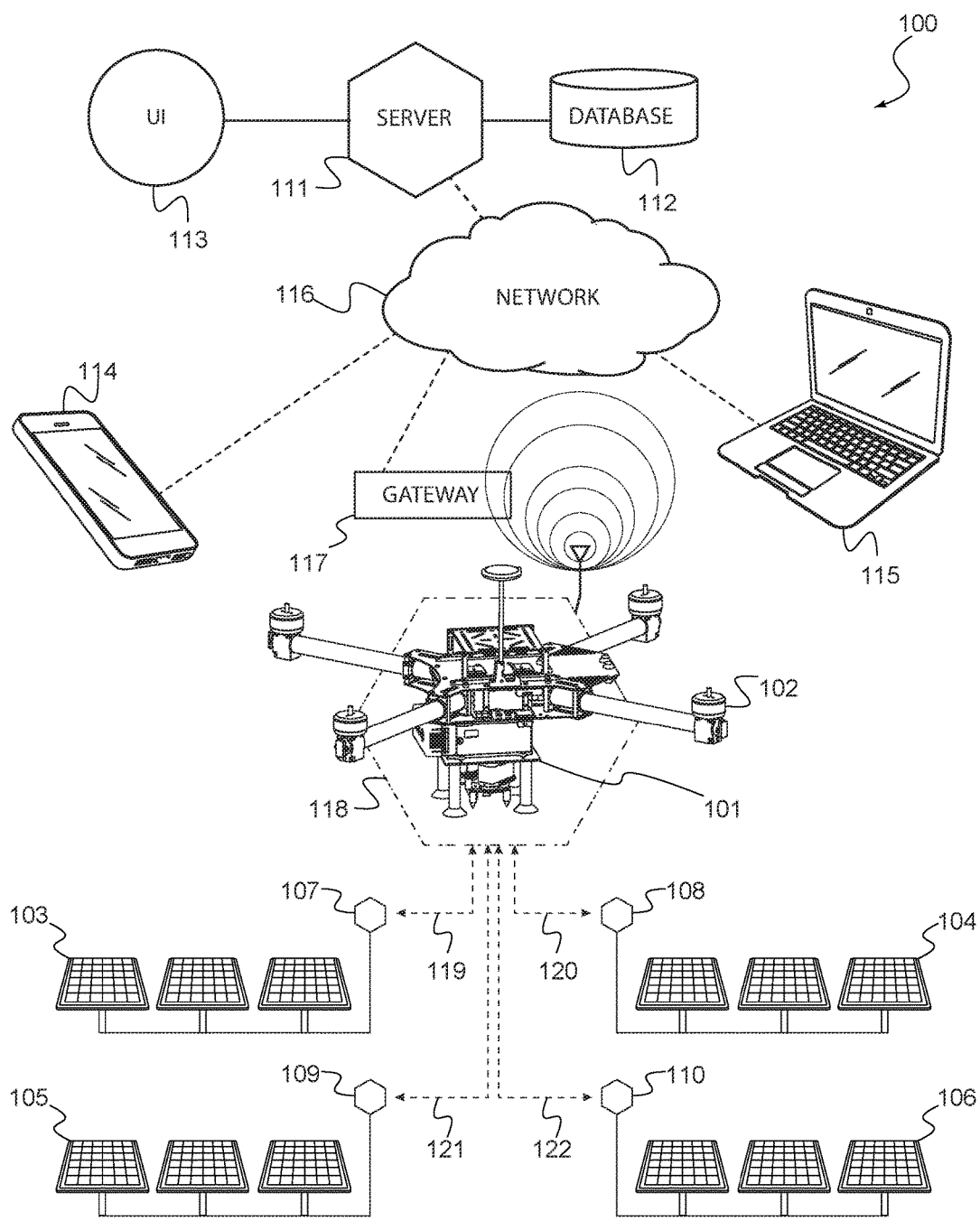
FIG. 1 illustrates a system in accordance with exemplary embodiments of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

The present disclosure relates to, among other things, programmable aerial drones that may be retrofitted or assembled with a solar panel positioning control assembly. The drone assembly may be generally configured to register with a docking station coupled to one or more solar panels, such that the drone may be programed with executable instructions for periodically traveling to the docking station and activating the solar panel positioning control assembly to adjust a position of the one or more solar panels coupled thereto. Exemplary embodiments of the present disclosure are described with reference to the drawings for illustration purposes and are not intended to limit the scope of the present disclosure.

Turning now to the figures, FIG. 1 illustrates a system in accordance with exemplary embodiments of the present invention. More specifically, FIG. 1 illustrates system 100, which comprises: a drone assembly 101 including an aerial drone (such as a prior art aerial drone 102, which in some exemplary embodiments may include a DJI MATRICE 100 that may be retrofitted to secure a frame as will be disclosed in more detail below, but of course other aerial drones may be employed without deviating from the scope of the present invention); one or more sets of solar panels 103, 104, 105, and 106, which are typically distributed throughout a solar farm; and one or more docking station as docking stations 107, 108, 109, and 110, which have been coupled, respectively, to each of the sets of solar panels 103, 104, 105, and 106, wherein the drone assembly 101 is configured to adjust a position of the one or more sets of solar panels 103, 104, 105, and 106.

Positioning, or an adjustment of the position of each of the sets of solar panels 103, 104, 105, and 106, may be achieved by deploying one or more docking stations throughout the solar farm, such as docking stations 107, 108, 109, and 110, which have been coupled, respectively, to each of the sets of solar panels 103, 104, 105, and 106. Generally, docking stations 107, 108, 109, and 110, are mechanically coupled to at least one of the solar panels in a given set of solar panels. In exemplary embodiments, each of the docking stations 107, 108, 109, and 110 includes a mechanism such as a gearbox that is suitable for adjusting a position of one or more solar panels.

Adjusting a position of one or more solar panels may include, for example and without limiting the scope of the present invention, one or more of: adjusting a pivoting angle, adjusting a variable height, adjusting a position of the solar panel along a track, or any other positioning adjustment suitable for maximizing a solar panel exposure to solar energy, or otherwise moving a solar panel to a desirable position. In exemplary embodiments, adjusting a position of one or more solar panels comprises controlling movement of the solar panel along an azimuth of the solar panel as well as controlling movement of the solar panel along an altitude of the panel. Accordingly, while in some exemplary embodiments solar panels 103, 104, 105, and 106 may comprise a single-axis design (for example for only controlling movement along an altitude) in some exemplary embodiments solar panels 103, 104, 105, and 106 may comprise a dual-axis design such that a first axis controls the azimuth of the panel and a second axis controls the altitude of the panel. As such, in exemplary embodiments, the docking stations 107, 108, 109, and 110 each includes a mechanism such as a gearbox that is suitable for adjusting a position of the one or more solar panels by engaging their single-axis or dual-axis designs.

Management of system 100 may be typically facilitated by a central server 111, which includes a database 112 and hosts a user interface 113 accessible to client devices 114 and 115 that may remotely access server 111 via a network 116. Communication with the one or more drones of system 100, including for example drone assembly 101, may be achieved via communication modules distributed throughout the field such as gateway 117 typically located in proximity to docking bay 118, where drone assembly 101 may remain stored during non-operational periods.

In exemplary embodiments, drone assembly 101 may be one of many drone assemblies in a solar farm. In some exemplary embodiments, only a single drone assembly may be utilized. Whether a single drone assembly or a plurality of drone assemblies are employed, typically, drone assembly 101 rests in a docking bay 118 wherein drone assembly 101 may recharge, upload information to server 116 be maintained and or stored during periods of nonuse as will be discussed further below with reference to other figures. In exemplary embodiments, when deployed during scheduled tasks, drone assembly 101 may be assigned and or programmed with certain flight paths, or drone assembly 101 may be programmed to determine its own flightpath to and from its assigned solar panels. For example, and without limiting the scope of the present invention, where drone assembly 101 is assigned for adjustment of the position of each of the sets of solar panels 103, 104, 105, and 106, then drone assembly may be programmed to fly paths 119, 120, 121, and 122, at certain scheduled and programmable time periods. Generally, such flight paths 119, 120, 121, and 122, may include roundtrip flights from docking bay 118 to each of the docking stations 107, 108, 109, and 110.

Generally, upon arrival at each of the docking stations 107, 108, 109, and 110, drone assembly 101 may initiate a landing and or docking sequence whereby a portion of the drone assembly registers securely with a portion of the docking station at which it lands. Moreover, because each docking station generally comprises a mechanism suitable for adjusting a position of the solar panels, once drone assembly is securely coupled to the docking station, one or more motors may be programmably activated to drive a coupling arm of the drone assembly 101 that engages with or is otherwise mechanically connected to the mechanism of the docking station suitable for adjusting a position of the solar panels.

In exemplary embodiments, after successfully executing a landing routine, whereby the drone assembly lands and is secured to a docking station, a solar panel adjustment or positioning routine may be initiated. For example, and without limiting the scope of the present invention, a solar panel adjustment or positioning routine may include: (i) determining a current azimuth of one or more solar panels coupled to the docking station (wherein an orientation of the solar panels coincides with an orientation of the docking station); (ii) determining a current altitude of the one or more solar panels coupled to the docking station; (iii) determining a desired or optimum azimuth and a desired or optimum altitude for the solar panels (for example, by using a solar position algorithm to calculate the solar zenith and azimuth angle); and (iv) actuating an arm of the drone assembly to adjust the solar panels according to the determined optimum azimuth and optimum altitude for the solar panels.

As will be detailed below with reference to other figures, in exemplary embodiments, each of the docking stations 107, 108, 109, and 110, may include self-locking worm gears to prevent external forces (e.g. wind) from turning the panels and may employ gears suitable for high gear ratios to minimize a required torque from the drone assembly motors. In exemplary embodiments, to ensure that drone assembly 101 properly registers with, and is secured to, each of the docking stations 107, 108, 109, and 110 during a positioning routine, drone assembly 101 may employ a plurality of landing posts with guiding receptacle bases that facilitate an error tolerance during landing; for example, and without limiting the scope of the present invention, exemplary embodiments that will be discussed below employ conical receptacles at each landing structure or landing posts that aid in stability when landing on a flat surface and, compared to simply making a wider foot cylinder, provides more room for gear to be mounted to the drone (see for example FIG. 4C, FIG. 5A-5D).

Server 111 may range in complexity but is generally a central server configured to issue commands to drone assembly 101 and any other drone assembly registered to database 112 of system 100. In exemplary embodiments, server 111 provides several functions and features to end-users, for example administrator users of server 111. These functions and features may include, without limitation: registration of new solar panels in the field in addition to solar panels 103, 104, 105, and 106, which may become available or operational with an expansion of the solar farm; registration of solar panel GPS coordinates and or any identification codes such as any two-dimensional barcode matrix including for example QR™ codes that may be associated with each of the docking stations 107, 108, 109, and 110; registration of users and or client devices 114 and 115, which may access and remotely monitor and or control certain aspect of system 100; registration of new drones that may be added to the field whether as an additional workforce or for back-up purposes; enabling and or dispatching drone assemblies such as drone assembly 101 to one or more assignments; creating and modifying schedules for drone assembly 100; and any other administrative, monitoring and or diagnostic activity of system 100 that may be performed locally and or remotely via server 111 by accessing user interface 113.

Some or all of the monitoring or administrative features and functionalities offered via server 111 may be offered to users on the solar farm via direct or local access to user interface 113, which may be accessed directly on a local computer (not shown) or via client devices 114 and 115 as mentioned above. Accordingly, user interface 113 may comprise a web interface accessible via a global network 116 such as the Internet, a software application accessible only via an intranet network 116, or a mobile application available to client devices 114 and 115 from any remote location with access to network 116.

In exemplary embodiments, user interface 113 allows users to, for example and without limiting the scope of the present invention: disable or enable individual panels or drones; schedule assignments such as recording footage of particular areas within the solar farm; view or download past footage; view diagnostic tools available via a dashboard (e.g. drone is offline, panel is unreachable); glean history/status of specific solar panels or drone assemblies; or set various policies or rules, such as but not limited to flying times and restrictions (e.g. no flying between 8 pm and 8 am, etc.), and desired rotation schedules (e.g. once every 40, 60, 80 minutes, etc.). These and other exemplary embodiments of the present invention will be discussed in turn.

Figure 2:
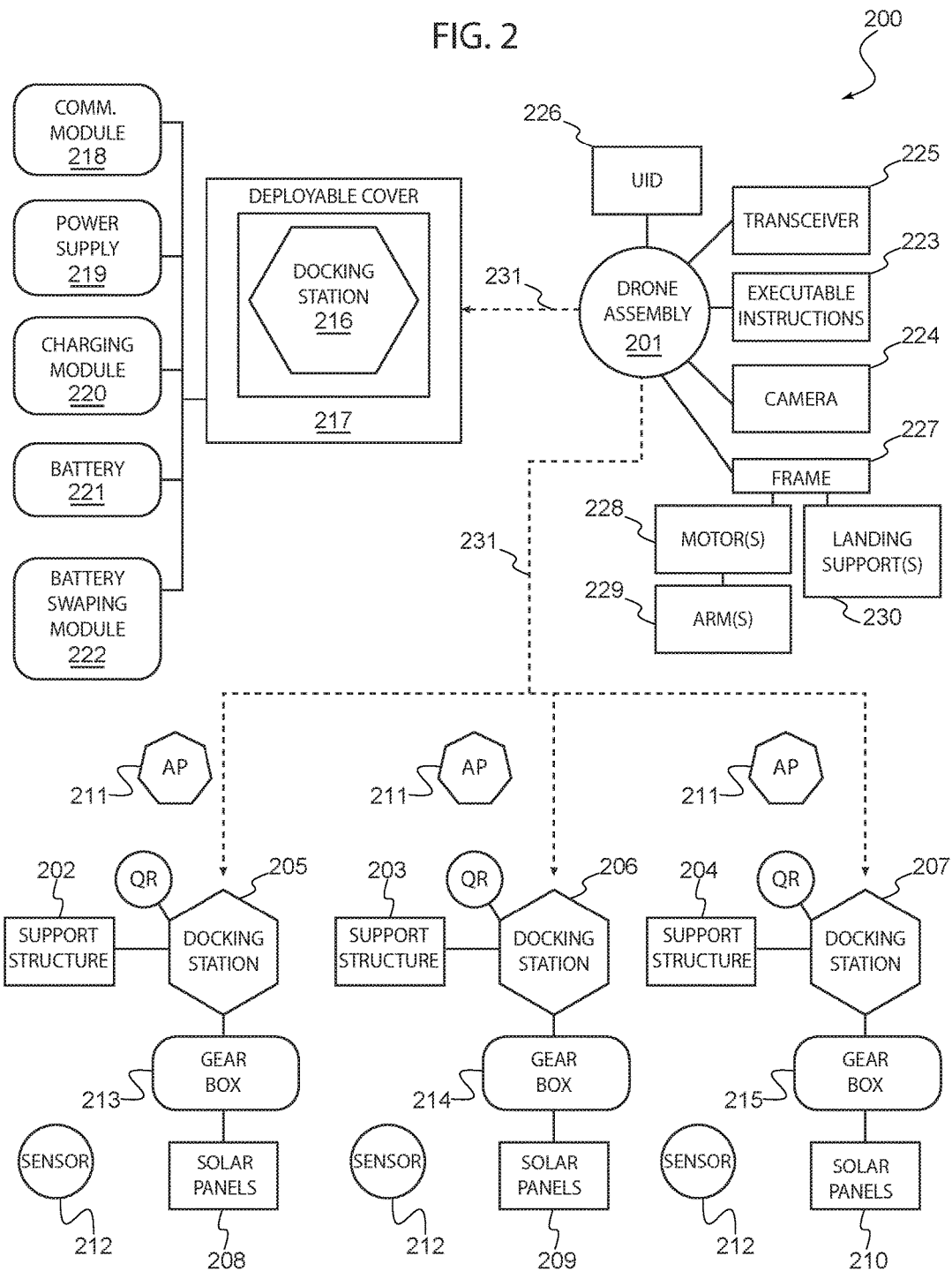
FIG. 2 illustrates a block diagram of system components in accordance with exemplary embodiments of the present invention.

Turning now to the next figure, FIG. 2 illustrates a block diagram of system components in accordance with exemplary embodiments of the present invention. More specifically, FIG. 2 depicts a diagram of system 200 components, a system in accordance with the present invention for positioning solar panels with automated drones, comprising drone assembly 201, which as with system 100 is configured to adjust a position of one or more sets of solar panels such as solar panels 202, 203, and 204, which are typically distributed throughout a solar farm and mechanically coupled to a plurality of docking stations such as docking stations 205, 206, and 207. Components that may complement system 200 in the field include, for example and without limiting the scope of the present invention: support structures 208, 209, and 210 for securing, respectively, each of docking stations 205, 206, and 207 to the field; a plurality of access points 211 for routing data throughout a network of system 200; and any sensor that may be suitable for better management of system 200, including but not limited to a plurality of weather sensors 212, which may be placed around a perimeter of the solar farm and configured to send out signals concerning changes in weather such as rain, snow, or wind conditions that may trigger return-to-base commands for drone assembly 201.

As mentioned above, in exemplary embodiments, each of the docking stations 205, 206, and 207 includes a mechanism such as a gearbox that is suitable for adjusting a position of the one or more solar panels that each docking station is coupled to. As such, each of docking stations 205, 206, and 207 may include a gearbox 213, 214, and 215, respectively, that mechanically connect each docking station to a set of one or more solar panels.

In exemplary embodiments, system 200 includes a docking bay 216 adapted with a deployable enclosure 217 that houses drone assembly 201 during non-operational periods and serves as a storage container to secure and protect drone assembly 201 from unnecessary exposure to the elements (i.e. whether from changing temperatures from days and nights, during inclement weather, to protect the drone assembly from dust particles in high desert areas, or to prevent or slow down regular wear and tear). Typically, docking bay 216 may comprise a landing platform where drone assembly 201 may land and deploy from, after and prior to any solar panel adjustment routines. Typically, deployable enclosure 217 includes deployable doors that seal or lock up drone assembly 201, and which may include sensors for avoiding opening or deploying drone assembly 201 in the event the sensors objects obstruct the deployable doors, or otherwise detect a hazardous condition. In exemplary embodiments, deployable enclosure 217 may include a communications module 218 for uploading data from drone assembly 201 to a server of system 200, as well as a power supply 219 for routing power to deployable enclosure 217, including to energy dependent components such as charging module 220 and battery or back-up power 221. In exemplary embodiments, charging module 220 may include a wireless chagrining module disposed in part on a landing surface of docking bay 216. In some exemplary embodiments, deployable enclosure may further house a battery swapping module 222 swapping batteries as necessary for continued operations during scheduled routines. Other features of deployable enclosure 217 may further include insulation and warmers to keep internal temperatures stable.

Drone assembly 201 includes a drone capable of autonomous or manual operation. Although this disclosure focuses on aerial drones, it should be noted that other types of drones such as terrestrial drones may be utilized in accordance with the present invention, although aerial drones provide the advantage of shorter distances of travel since they travel by air. Similarly, although manual operations of drones is possible and may be implemented without deviating from the scope of the present invention, it is poised by this disclosure that automation eliminates certain human work hours and thus allows system 200 to operate at a higher efficiency. Particularly to facilitate automation, the aerial drone of drone assembly 201 is typically equipped with circuitry sophisticated enough to store executable instructions 223 for running a myriad of routines including global positioning system (GPS) related tasks, taking footage with an onboard camera 224 and transmitting and or receiving communications from components and or the server (not shown) of system 200 via a transceiver 225.

In some exemplary embodiments, drone assembly 201 utilizes camera 224 and basic image recognition algorithms to identify each of its assigned docking stations. In exemplary embodiments, camera 224 is a stereo camera suitable for obtaining detailed measurements of the environment and relative position information. In some exemplary embodiments more than one camera may be employed for detailed depth information and foreknowledge of precise dimensions of the drone assembly and of the landing platforms as important inputs of a landing algorithm or routine. Moreover, in some exemplary embodiments, for example, and without deviating from the scope of the present invention, each of docking stations 205, 206, and 207 may include a unique identification code (UID) that may comprise a two-dimensional matrix barcode such as a Quick Response Code or QR™ code, which drone assembly 201 may use to identify the same. Such QR™ codes may be associated with a UID 226 of drone assembly 201 in a database of the server of system 200. The following figure discusses a server suitable for system 200 and in accordance with exemplary embodiments of the present invention.

Typically, drone assembly 201 includes a frame 227, such as a platform to which at least one or more motors 228 may be secured, each of which may be coupled to one or more arms 229 configured to register with a gear arm or component of the gearboxes in the docking stations. Furthermore, frame 227 typically includes one or more landing supports 230 suitable for securing drone 201 to each of the docking stations in the filed of system 200. Accordingly, drone assembly 201 may include one or more landing posts secured to frame 227, at least one of the one or more landing posts configured to register with one of the docking station 205, 206, and 207, including gearboxes 213, 214, and 215 mechanically coupled to the one or more solar panels 208, 209, and 210; one or more arms coupled to one or more motors secured to the frame, the one or more arms configured to actuate the gearbox of the docking station; and a control circuitry for supplying power to the one or more motors, the control circuitry configured to: fly the aerial drone assembly to the docking station; land the aerial drone assembly on a platform of the docking station such that at least one of the one or more landing posts registers with a docking post of the docking station and the one or more arms engage with a gearbox arm of the docking station; and adjust a position of the one or more solar panels by actuating the one or more arms.

Figure 3:
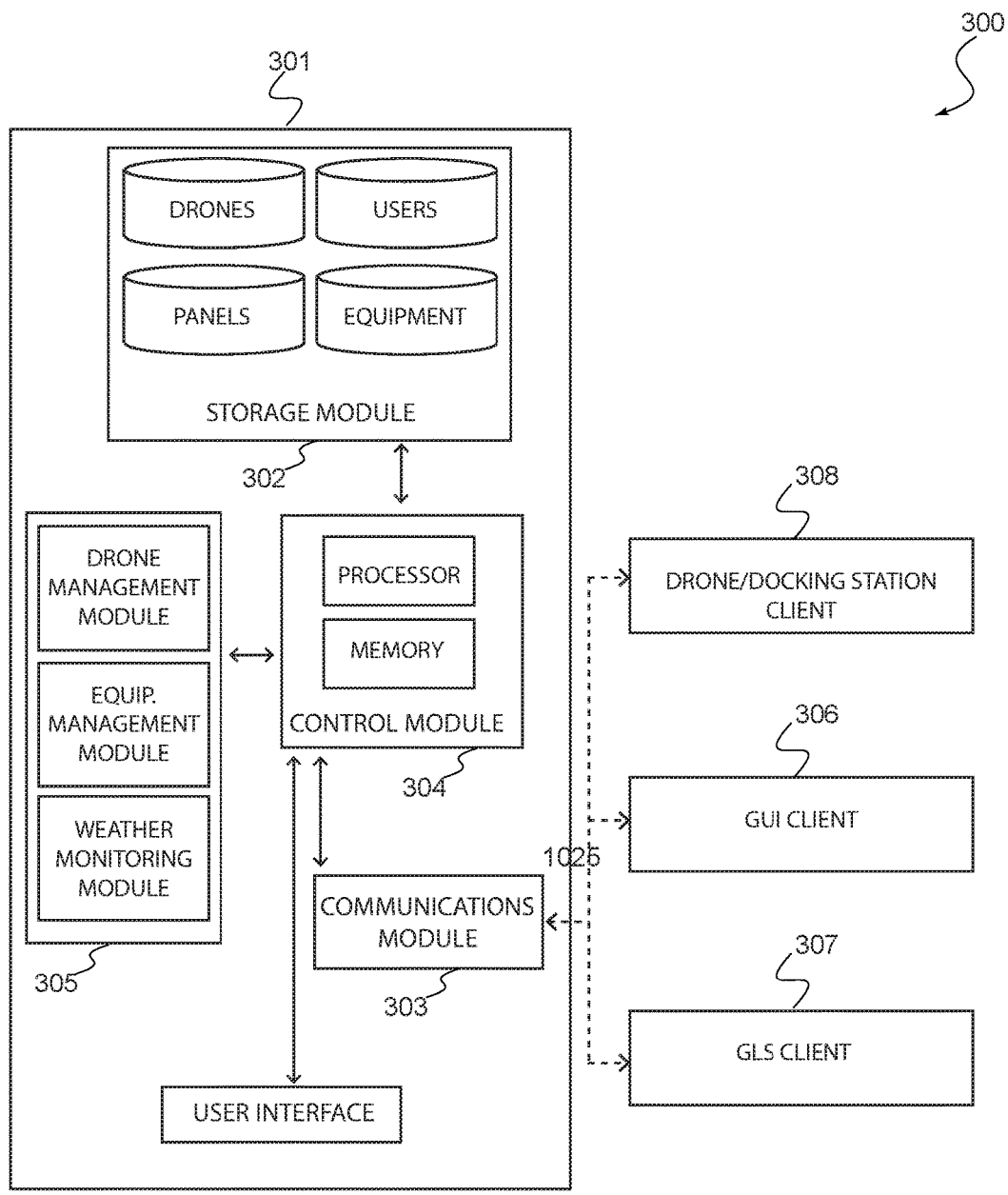
FIG. 3 illustrates a computer-readable medium for controlling elements of a system in accordance with exemplary embodiments of the present invention.

Now with reference to FIG. 3, a computer-readable medium or server for controlling elements of a system, in accordance with exemplary embodiments of the present invention, is illustrated. More specifically, FIG. 3 illustrates a block diagram of a computer-readable medium 300, including server 301, which comprises storage module 302, communications module 303, control module 304 and software module 305. Moreover, server 301 includes GUI client 306, GLS client 307, and drone/docking station client 308.

Server 301 may be configured with any known techniques and in any known manner to achieve a desired security and functionality. Whatever architecture, technique or manner in which server 301 is implemented, server 301 is typically configured to monitor and administrate the various routines for the one or more drone assemblies, including but not limited to: disabling or enabling one or more sets of solar panels or drone assemblies; scheduling assignments such as recording footage of particular areas within the solar farm; viewing or downloading past footage; providing access to a user interface for displaying diagnostic tools available via a GUI dashboard for displaying indicators such as signaling drone is offline, or whether a solar panel is unreachable due to an obstruction or otherwise, or displaying history and activity logs associated with the system; providing means to configure rules and protocols, such as but not limited to controlling flying times and restrictions or desired rotation schedules.

In some embodiments, one or more servers may manage several aspects of the system. For example, and without deviating from the scope of the present invention, a GUI server may be dedicated to services such as web GUI services or mobile application services. A geographic location services server or GLS server may be implemented for providing geographic location services. For example, a GLS server may facilitate a GLS client (for communicating with a third-party server that helps server 301 implementing known geographic location services in the field to help locate, navigate and manage drone assemblies deployed in throughout the solar farm monitored by server 300.

Storage module 302 may be coupled either externally or internally to server 301. For example, storage 302 may be one or more long term memory storage devices, such as a hard drive, disk drive, tape unit, Network Attached Storage (NAS) device, Storage Attached Network (SAN) device, RAID disk array, or optical disk array. Although typically a long term memory storage device, storage 302 may be any other memory device without departing from the scope of the present invention. In an exemplary embodiment, storage 302 is striped across redundant storage containers or RAID disk array in a SAN environment for increased data access speeds and robustness. Of course, any other storage configuration would not deviate from the scope of the present invention so long as storage 302 is suitable for the needs of server 301. In one exemplary embodiment, storage module 392 is a cloud-based storage solution suitable to host one or more databases for the system managed by server 301.

Storage module 302 may hold multiple databases containing data objects within data repositories collected by server 301. The databases of storage module 302 may be created by a known database manager using known technologies such as relational architecture and SQL access, such as Microsoft™ SQL or Oracle™ DB. However, the database of storage module 302 may be as simple as a series of files stored in a directory, with a text file listing filename locations without departing from the scope of the present invention. In one embodiment, the one or more databases of storage module 302 may be a combination of a known database manager, and an organized directory tree structure, wherein the database manager stores text information in the database itself, but stores multimedia information and other non-text information as filename locations of files stored in an organized directory tree structure. In an embodiment wherein server 301 relies on cloud computing, storage module 302 may include technologies offered by Amazon™ such as Amazon™ Elastic Compute Cloud (AWS EC2), whereby storage module 302 may employ MySQL™ and AWS EC2™ instances.

The one or more databases of storage module 302 may hold multiple data repositories corresponding to: drone assemblies, including active or inactive drones; users such as administrators or authorized users of the system; solar panels including active and inactive solar panels; geographical boundaries, i.e. for safety reasons; registered equipment such as access points, weather sensors, docking stations, back-up batteries, and or any other equipment that may be utilized in the system including their active or inactive status and location on the solar farm.

Communications module 303 may be implemented as a single device or multiple devices configured to connect server 301 to a network such as the internet, and or communicate server 301 to other system components, including other servers such as web servers, mobile device application servers, and/or a geographic location services server.

Control module 304 typically includes one or more processors and memory configured to execute a set of one or more executable instructions such as program code and/or data stored on one or more computer readable mediums to implement the various applications, data, steps described below and any other instructions pertinent to the functions of server 301. For example, such executable instructions may be included in software module 305.

Software module 305 may include one or more modules for the various functions of the system managed by server 301. For example, and without limiting the scope of the present invention, software module 305 may include a drone management module, an equipment management module, a weather monitoring module, and other software modules that help create, track and monitor operations of drone assemblies in the field. In exemplary embodiments, software module 305 may include executable instructions for implementing a Solar Position Algorithm in order to calculate the solar zenith and azimuth angle for drone assemblies in the field to determine a desired or optimum azimuth and altitude for one or more solar panels. Similarly, software module 305 may include executable instructions for determine a desired or optimum azimuth and altitude for one or more solar panels or more generally an optimum position of the solar panels and communicate instructions in accordance with these determinations so that drone assemblies in the field may adjust the solar panels accordingly.

Server 301 may include various clients, such GUI client 306, GLS client 307, and drone/docking station client 308. These clients may include hardware components and software components configured to communicate with server 301 in order to receive requests from client devices, use location-based methods to provide relevant records, handle the various requests for information, as well as overseeing that operations run efficiently in the system.

Figure 4A:
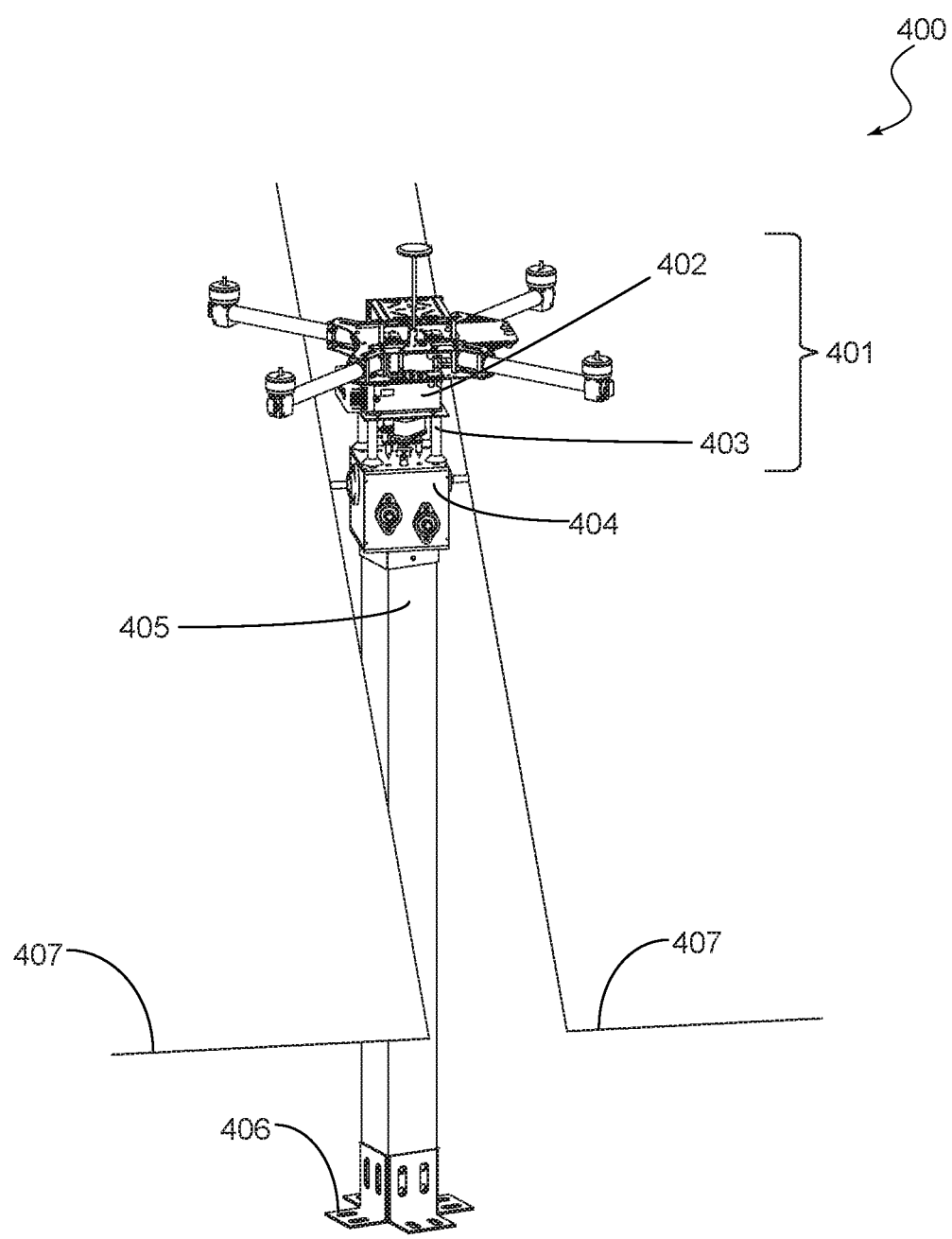
FIG. 4A illustrates a perspective view of a drone assembly and docking station coupled to one or more solar panels, in accordance with exemplary embodiments of the present invention.
Figure 4B:
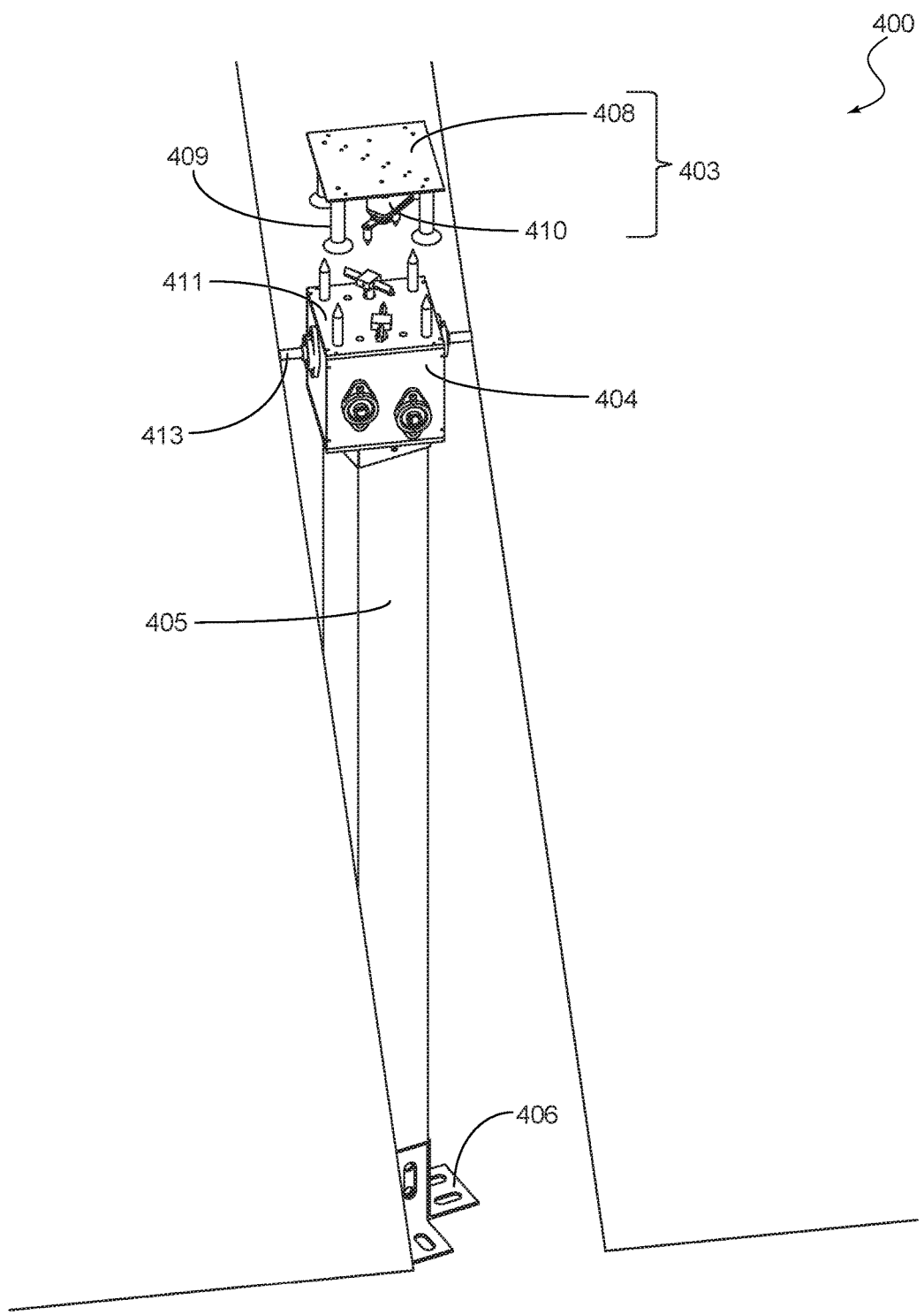
FIG. 4B illustrates a perspective view of a drone attachment and docking station coupled to one or more solar panels, in accordance with exemplary embodiments of the present invention.

Turning now to the next set of figures, a more focused discussion follows, regarding a drone assembly and docking station system in accordance with the present invention for autonomously adjusting a position of one or more solar panels. FIG. 4A illustrates a perspective view of a drone assembly and docking station coupled to one or more solar panels, in accordance with exemplary embodiments of the present invention; FIG. 4B illustrates a perspective view of a drone attachment and docking station, the drone attachment configured to retrofit a standard prior art aerial drone for a system in accordance with the present invention; and FIG. 4C illustrates a close-up view of the drone attachment and docking station depicted in FIG. 4B.

With reference to FIG. 4A, system 400 is depicted including drone assembly 401, which includes an aerial drone 402 that has been retrofitted with a drone attachment 403 configured to register with docking station 404. Docking station 404 is mechanically coupled to a plurality of solar panels 407 at opposite sides of docking station 404. Docking station is typically supported by a support structure, in this case an elongated stand 405, which is secured to a surface (i.e. typically the ground in a solar farm) via a support means 406.

In this exemplary embodiment, stand 406 elevates docking station so that a shaft 413 (see also FIG. 4B) mates with and along a first rotating axis or pivoting joint of solar panels 407, which enables a rotation of solar panels 407 about said first rotating axis whenever shaft 413 rotates, for example, so that solar panels 407 may be tilted or moved along an altitude of the solar panels 407. Similarly, docking station 404 may itself rotate about a second rotating axis (in this case typically perpendicular to the first rotating axis), which enables a rotation of solar panels 407 about said second rotating axis whenever docking station 404 rotates, for example, so that solar panels 407 may be rotated or moved along an azimuth of the solar panels 407. When a landing routine is executed by drone assembly 401, portions of drone attachment 403 engage with portions of docking station 404, which actuate a gearbox of docking station 404 in order to rotate docking station 404 and or rotate shaft 413 and accordingly rotate, tilt and or otherwise adjust a position of solar panels 407 to a desired position. As a daily routine sees a change in direction of sunlight, several landing routines or flight trips may be executed by drone assembly 401 in order to adjust a position of solar panels 407 accordingly to maximize reception of solar energy by photovoltaic cells disposed along a surface of solar panels 407. As will be mentioned further below, known algorithms, such as a Solar Position Algorithm may be employed to calculate the solar zenith and azimuth angle in order to maximize reception of solar energy.

Accordingly, in exemplary embodiments, drone assembly 401 is configured to land on a surface or platform of docking station 404 and drive one or more motors of the drone attachment 403 to actuate shaft 413 and ultimately adjust a position of solar panels 407. Because each drone assembly is typically configured with a set of programmable instructions, drone assembly 401 will typically execute a landing routing and once engaged with docking station 404, drive motors of drone attachment 403 per programmable instructions that dictate the rotation required for docking station 407 and or shaft 413 to adjust solar panels 407 to the desired position for that desired routine.

With reference to FIG. 4B, drone attachment 403 is shown detached from aerial drone 402 for illustrative purposes. In this embodiment, drone attachment 403 is removable and suitable for retrofitting prior art aerial drones to land on and securely actuate a gearbox within docking station 404. To these ends, drone attachment 403 may include a flat platform or frame 408, which may be configured to couple to a bottom portion of a prior art aerial drone such as aerial drone 402. In exemplary embodiments, frame 408 is easily secured to aerial drone 402 by a set of screws. Typically, frame 408 is a support structure for one or more motors (such as motors 410), and landing posts 409 that register with complementary docking posts 414 generally protruding upwards from a top surface 411 of docking station 404.

Now with reference to FIG. 4C, from the close-up of drone attachment 403 (for illustrative purposes shown without aerial drone 402), it may be appreciated that drone attachment 403 includes coupling arms 412 that engage with rotating arms 415 of docking station 404. In exemplary embodiments, coupling arms 412 are configured to rotate rotating arms 415, which in turn actuate the gearbox or similar mechanical component of docking station 404 in order to rotate docking station 407 and or shaft 413 and adjust a position of solar panels 407. As will be explained further and in more detail in the next set of figures, landing posts 409 typically include a cavity therein such that landing posts 409 are configured to receive a portion of docking posts 414 within said cavity. This coupling between drone attachment 403 of drone assembly 401 and docking station 404 ensures that the drone assembly is secured against surface 411 of the docking station in order to avoid undesired instability or rotation by the drone when motors 410 are engaged and driven to rotate coupling arms 412. Such stability facilitates the turning and thus actuating of the gearbox within docking station 404 via the rotation of rotating arms 415. Shaft 413 typically protrudes from opposite side walls 416, which may form a cavity within docking station 404 that houses the gearbox configured to rotate shaft 413 upon actuation of rotating arms 415. To support docking station 404 to stand 405, a base or bottom portion of docking station 404 may include a brace 417 configured to receive a portion of stand 405 therein. Moreover, as disclosed in greater detail with reference to FIG. 7B-FIG. 7C, docking station 407 may be rotatably coupled to stand 405 in a manner such that rotating a first coupling arm and or gear member of the gearbox within docking station 407 will cause shaft 413 to rotate, while rotating a second coupling arm and or gear member of the gearbox within docking station 407 will cause docking station 407 to rotate about a longitudinal axis of stand 405.

Figure 5A:
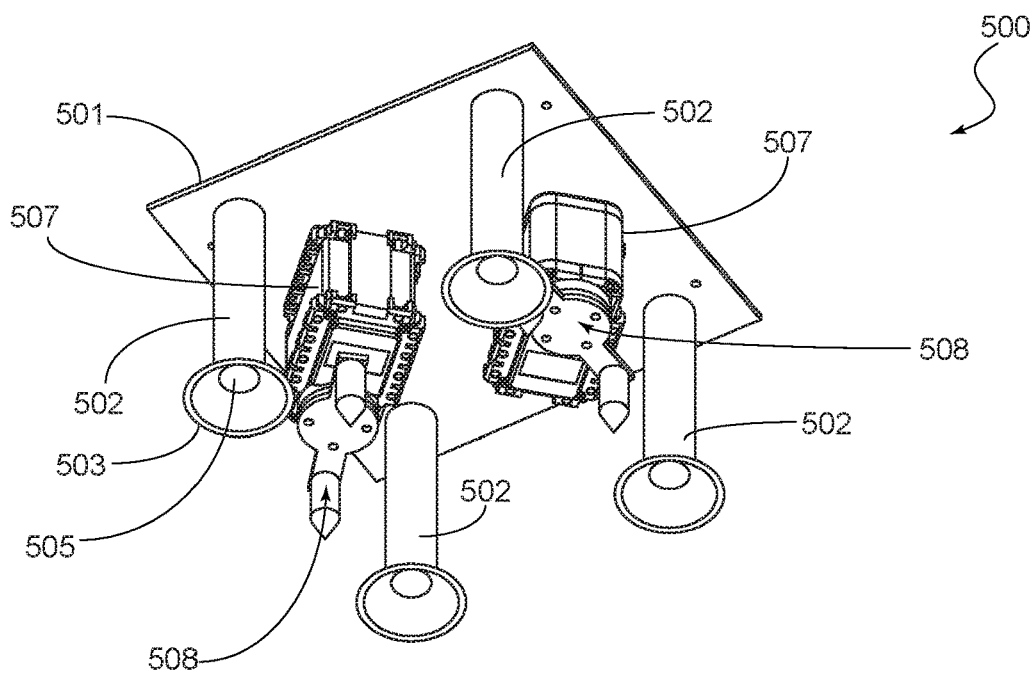
FIG. 5A illustrates a bottom perspective view of a drone attachment in accordance with exemplary embodiments of the present invention.
Figure 5B:
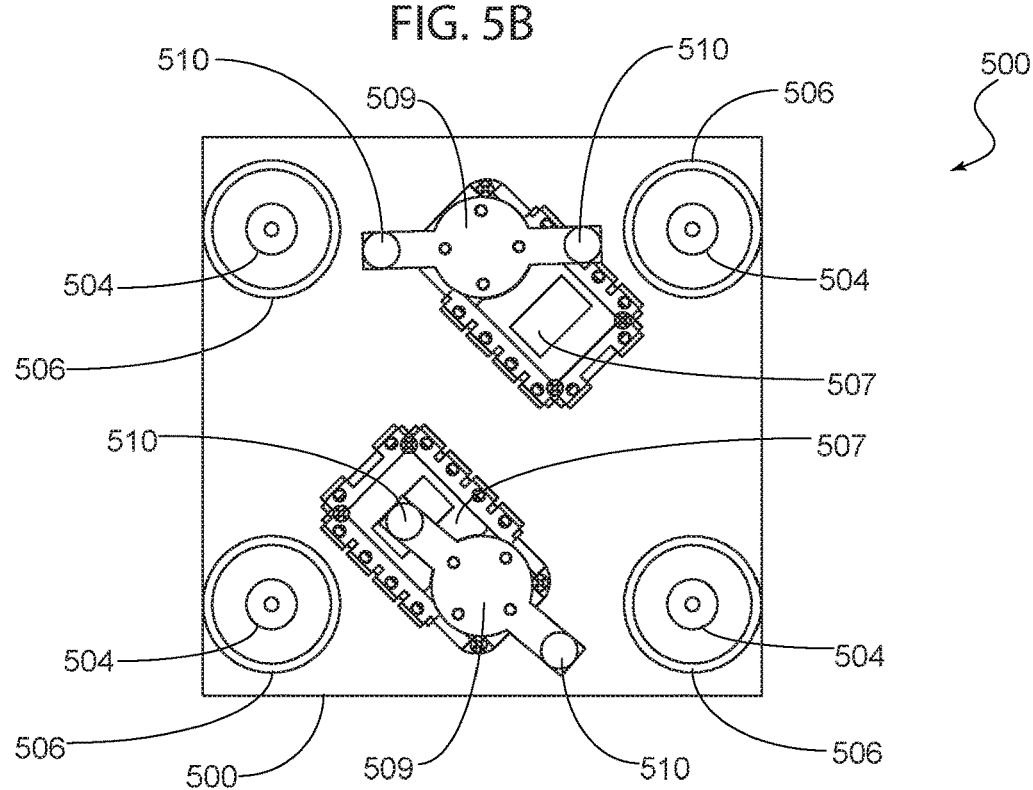
FIG. 5B illustrates a bottom view of a drone attachment in accordance with exemplary embodiments of the present invention.
Figure 5C:
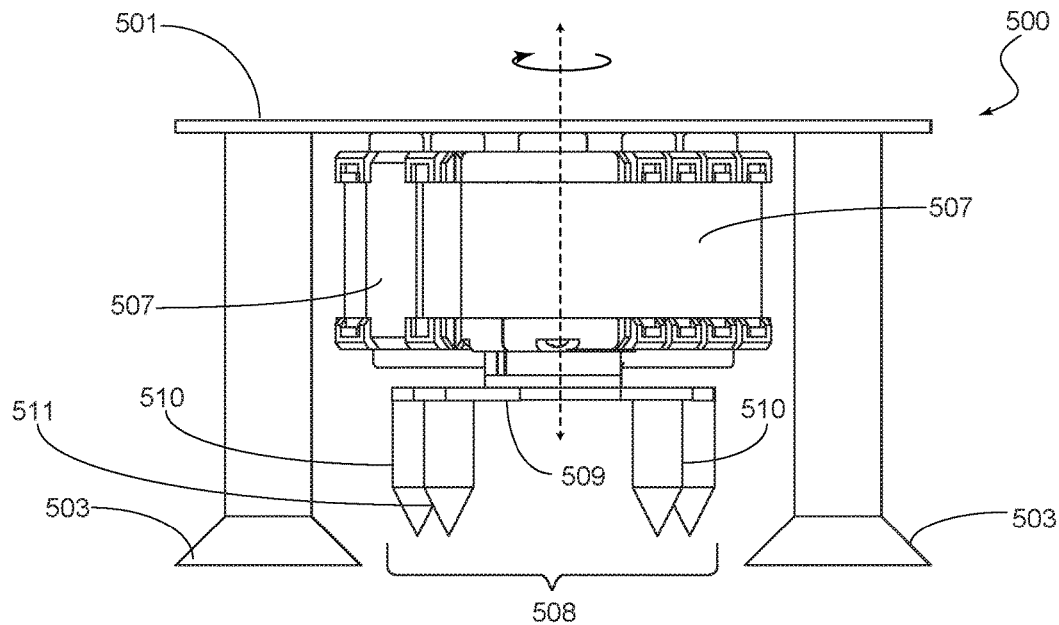
FIG. 5C illustrates a side view of a drone attachment in accordance with exemplary embodiments of the present invention.
Figure 5D:
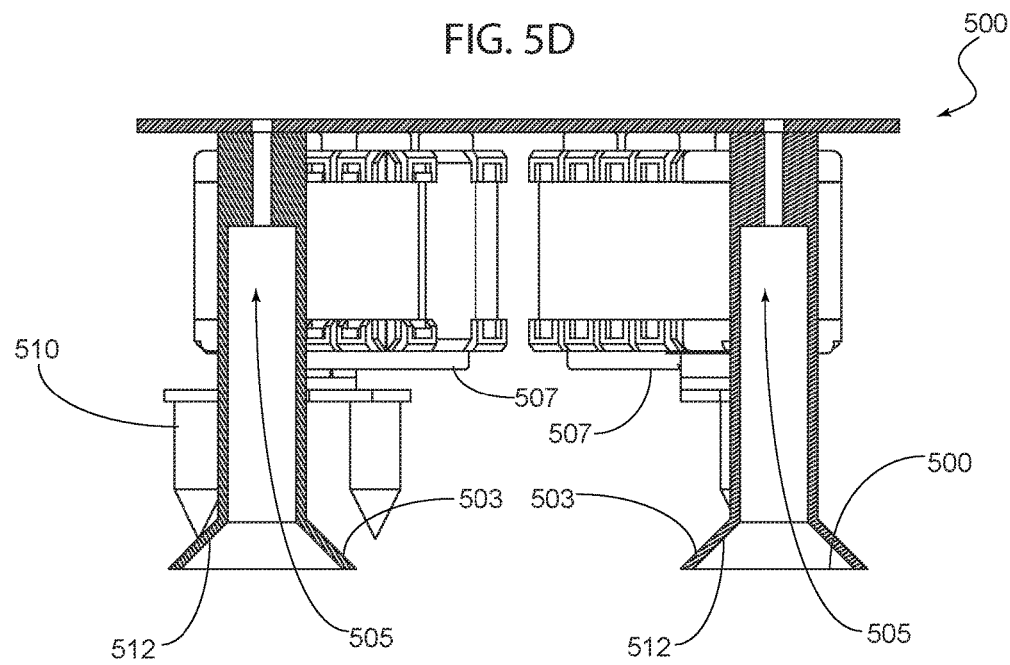
FIG. 5D illustrates a cross-sectional view of a drone attachment in accordance with exemplary embodiments of the present invention.
Figure 5E:
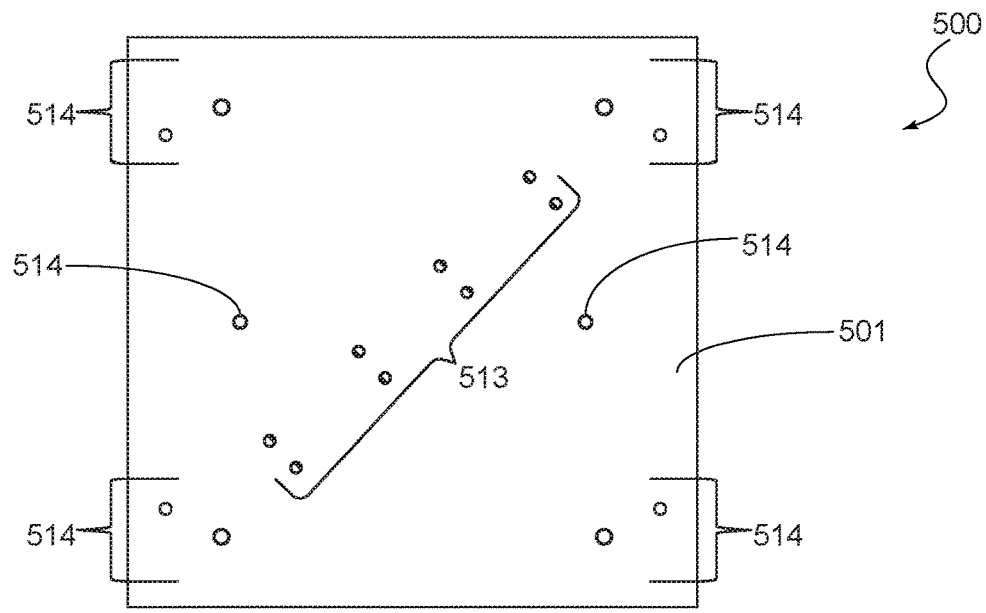
FIG. 5E illustrates a top view of a drone attachment in accordance with exemplary embodiments of the present invention.

Turning now to the next set of figures, a more focused discussion follows regarding a drone attachment in accordance with an exemplary embodiment of the present invention. FIG. 5A illustrates a bottom perspective view of an exemplary drone attachment; FIG. 5B illustrates a bottom view thereof; FIG. 5C illustrates a side view thereof; FIG. 5D illustrates a cross-sectional view; and FIG. 5E illustrates a top view of the drone attachment.

With reference to these figures, drone attachment 500 may exemplarily comprise of a flat support structure or frame 501, a plurality of landing supports such as legs or landing posts 502, each of said landing posts 502 including receptacle bases such as conical receptacles 503 at a base of the landing post 502 that expand an aperture 504 leading into a narrow cavity 505, such that the conical receptacles 503 have a wider circumference 506 than a circumference of both aperture 504 and cavity 505 of each landing post 502. As mentioned above, and as will become more evident in discussions below, each landing post 502 is configured to receive a portion of docking posts of a docking station that register within each landing post 502, and more specifically within their cavity 505. In exemplary embodiments, the conical receptacles 503 expand uniformly from aperture 504, which allow for error tolerance while landing since the slanting side walls 512 of the conical shape aids to guide a complementarily shaped docking posts (as will be discussed below). Furthermore, conical receptacle 503 also improve stability when landing on a flat surface and provides more room for gear to be mounted to the drone, since each tubular or cylindrical body of each landing post 502 may be reduced—making room for example for stronger motors or improved coupling arms. As may be appreciated from each view, each landing post 502 is positioned and extends from or substantially near a perimeter of a bottom surface of frame 501.

Also extending from the bottom surface of frame 501 of drone attachment 500, are motors 507. Any motor suitable for the task of actuating a gearbox within a docking station in accordance with the present invention may be implemented without deviating from the scope of the present invention. In exemplary embodiments, motors 507 are rotary actuators that allows for precise control, velocity and acceleration of coupling arms 508, and may comprise of servomotors including a suitable motor coupled to and their own controller. In some exemplary embodiments, the servomotors may include a pair of Dynamixel AX-12A RC servos, but of course other servomotors may be employed without deviating from the scope of the present invention. In exemplary embodiments two motors are utilized but it is envisioned that more motors may be employed, or a single stronger motor may be used, without deviating from the scope of the present invention. In the embodiment of this set of figures two motors 507 are positioned between landing posts 502.

Each motor is configured to rotate a coupling arm 508, which comprises of a rotating arm 509 and coupling posts 510, which extend perpendicular to a length of rotating arm 509 and run parallel along the rotating axis of the motor 508. Each coupling post 510, extending from each of motors 507 rotating arm 509, includes a guiding tip or tip 511 configured to allow for an error tolerance when engaging or registering with a rotating arm of a docking station (i.e. which as discussed above facilitates actuation of the gear mechanism of each docking station). In exemplary embodiments, each tip 511 may simply include a conical tip or a gradually pointed end that terminates with a narrower circumference than that of a body of the coupling posts 510—as will be explained with reference to other figures below, when a drone assembly lands on a docking station, tips 511 connect with a complementary shape or a portion of a rotating arm of the docking station to ensure that coupling arms 508 (and thus post 510) properly engage with the rotating arms of the docking station. For example, such configuration may ensure that portions of the drone assembly do not prevent the aerial drone from successfully landing on the docking station. Each coupling post 510 may be tubularly or cylindrically shaped with a uniform circumference along its length up until the conical tip 511 that gradually narrows the body of the component to a point as shown. In some exemplary embodiments, one of the motors may drive one of the rotating arms 509 in order to rotate the docking station about a first rotating axis that causes one or more solar panels attached to the docking station to move along an azimuth of the one or more solar panels; and another motor may drive another of the rotating arms 509 in order to rotate a shaft of the docking station about a second rotating axis that causes one or more solar panels attached to the docking station to move along an altitude of the one or more solar panels.

With reference specifically to FIG. 5E, it may be appreciated that a top surface of frame 501 may include a plurality of openings to receive each of the components attached to the frame 501 as previously disclosed. Moreover, this construction allows the frame to be easily coupled to a bottom portion of a prior art drone. In the embodiment of FIG. 5A-5E, for example and without limitation, a first plurality of apertures or holes 513 may run diagonally through a center region of the top surface of frame 501, and additional apertures or holes 514 may be spread throughout the frame for securing one or more of the components mentioned above, as well as securing the frame itself to a portion of the aerial drone.

Figure 6:
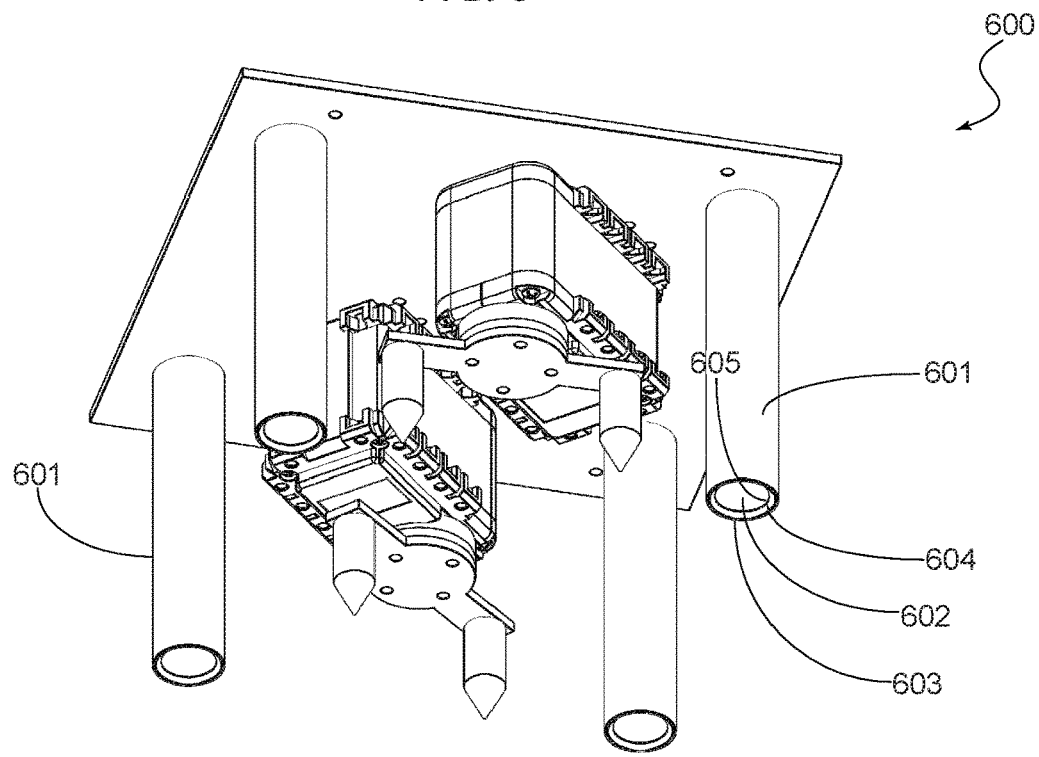
FIG. 6 illustrates a bottom perspective view of a drone attachment in accordance with exemplary embodiments of the present invention.

Turning now to the next figure, FIG. 6 illustrates a bottom perspective view of a drone attachment in accordance with exemplary embodiments of the present invention. More specifically, FIG. 6 depicts drone attachment 600, which is very similar to drone attachment 500, except that landing posts 601 have uniform circumference along an entire length of the landing post and do not employ conical receptacles. In this embodiment, although each landing post 601 includes a uniform exterior length throughout the entire elongate tubular or cylindrical body of the component, an entry onto cavity 602 nonetheless includes a slanted edge, similar to edge 512 of conical receptacles 503, which function in a similar manner to allow for an error tolerance when engaging or registering with a docking post of a docking station. Accordingly, in this exemplary embodiment, landing posts 601 of drone attachment 600 may include a first outer aperture 603 and conical slanted edge 604 that terminates at a second narrower aperture 605 with a circumference that is smaller than the circumference of the first outer aperture.

Figure 7A:
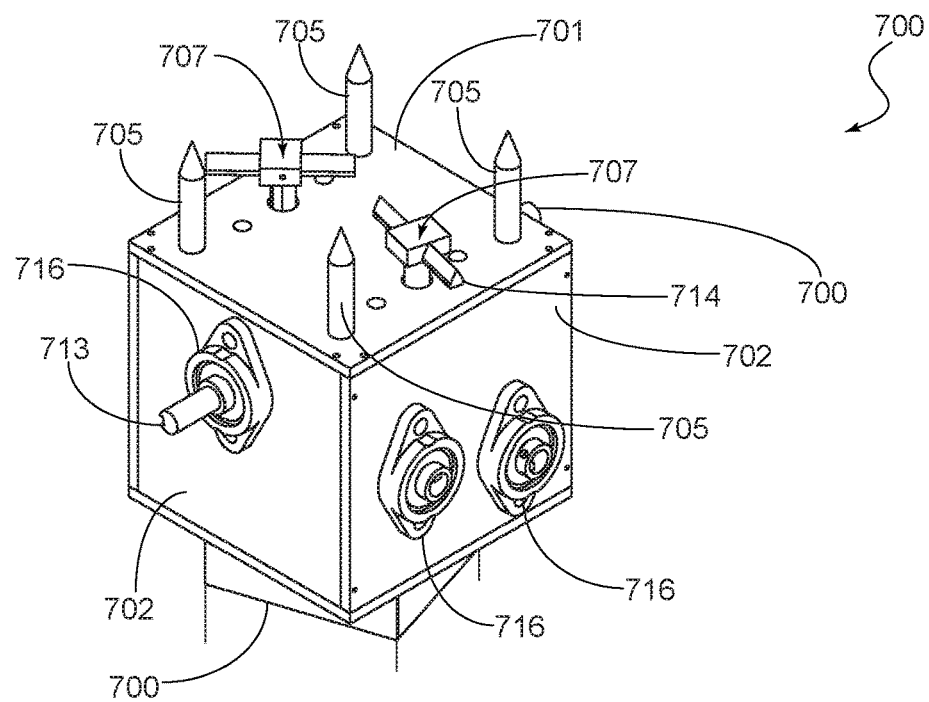
FIG. 7A illustrates a perspective view of a docking station for controlling an orientation of one or more solar panels in accordance with exemplary embodiments of the present invention.
Figure 7B:
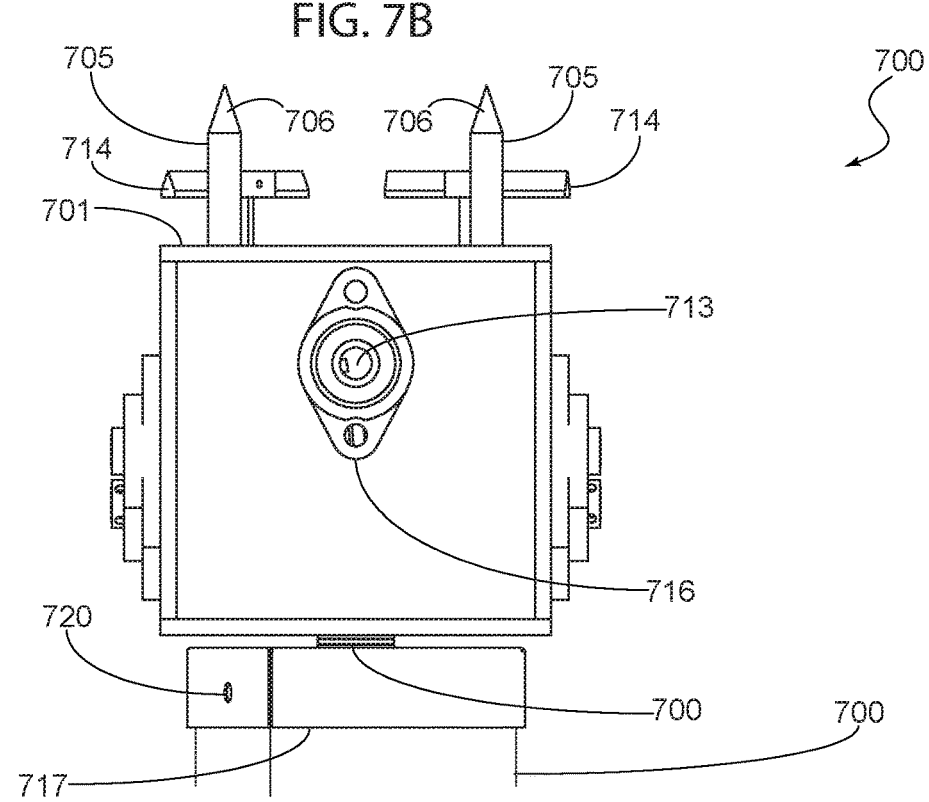
FIG. 7B illustrates a side view of a docking station in accordance with exemplary embodiments of the present invention.
Figure 7C:
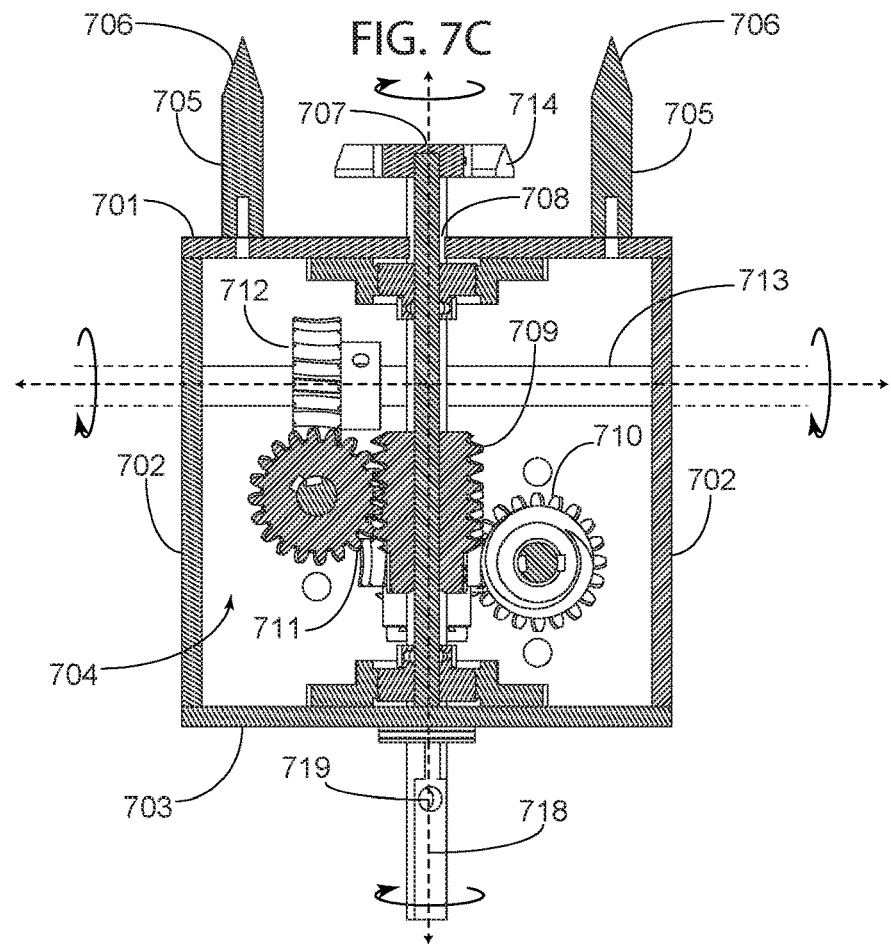
FIG. 7C illustrates a cross-sectional view of a docking station in accordance with exemplary embodiments of the present invention.
Figure 7D:
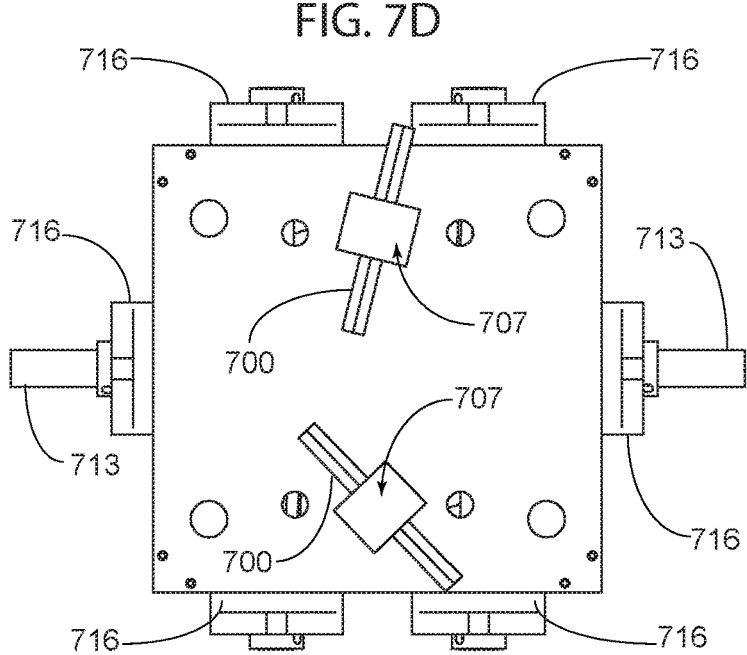
FIG. 7D illustrates a top view of a docking station in accordance with exemplary embodiments of the present invention.

With reference to the next set of figures, a more focused discussion regarding a drone docking station in accordance with an exemplary embodiment of the present invention, follows. FIG. 7A illustrates a perspective view of a docking station for controlling an orientation of one or more solar panels; FIG. 7B illustrates a side view thereof; FIG. 7C illustrates a cross-sectional view thereof; and FIG. 7D illustrates a top view of the docking station.

Docking station 700 may comprise any suitable shape without deviating or limiting the scope of the present invention, so long as docking station 700 employs a suitable landing platform and is configured to mechanically couple and move a position of one or more solar panels attached thereto. In exemplary embodiments, such as the one presented in these figures, docking station 700 comprises landing platform or top surface 701 supported in part by a plurality of side walls 702 and a bottom support plate 703. In the shown exemplary embodiment, docking station 700 is generally cubical, although any other suitable shape for housing mechanical components therein may be employed without limiting or deviating from the scope of the present invention. Typically, side walls 702, bottom support plate 703 and top surface 701 form an enclosure with a cavity 704 therein that houses a gear mechanism configured to adjust or move one or more solar panels coupled to docking station 700. While in some exemplary embodiments docking station may accommodate a single-axis design of solar panels coupled thereto (for example for only controlling movement along an altitude of the solar panels) in other exemplary embodiments docking station may accommodate a dual-axis design of the solar panels coupled thereto such that the gear mechanism of the docking station is configured to control the azimuth of the solar panel(s) as well as the altitude of the panel(s). As such, in exemplary embodiments, docking station 700 typically includes a mechanism such as a gearbox that is suitable for adjusting a position of the one or more solar panels by engaging their single-axis or dual-axis designs.

As mentioned above, top surface 701 serves as a landing platform for a drone assembly in accordance with the present invention. Said landing platform or top surface 701 may include a plurality of docking posts 705 extending from the top surface 701 and protruding upwards. Docking posts 705 are preferably configured to register with landing posts of a drone assembly in accordance with this invention, and as such may include a shape that is complementary to the same. For example, and without limiting the scope of the present invention, where docking station 700 is configured to register with drone attachment 500, a circumference of the cylindrical body of each docking post 705 is slightly smaller than that of the narrow cavity 505 of landing posts 502.

Furthermore, and as mentioned above to allow for error in the automated landing routines of a drone (for example to account for wind, or other factors that may affect a flight) guiding tips 706 may be conically shaped so as to be guided when entering or registering with, for example, conical receptacles 503 of landing posts 502 of drone attachment 500. In the present embodiment of docking station 700, four docking posts 705 configured to register with landing posts are provided, but of course providing less or more coupling means may be implemented without deviating from the scope of the present invention.

Moreover, top surface 701 includes one or more gearbox arms or rotating arms 707. Each rotating arm extends through apertures or openings 708 and are mechanically coupled to one or more gears 709, 710, 711, and 712 that when actuated turn a shaft 713 and or a shaft 718, which in turn rotates to actuate a mechanical component that moves one or more solar panels coupled to docking station 700. Each rotating arm 707 may include a coupling component 714 that couples with a complementary element of a drone assembly or drone attachment in accordance with the present invention. For example, and without limiting the scope of the present invention, where docking station 700 is configured to register with drone attachment 500, coupling component 714 couples with coupling post 510 of coupling arm 508 so that as motor 507 drives or turns coupling arm 508, coupling component 714 is engaged and rotates as well to turn one or more of gears 709, 710, 711, and 712 actuate shaft 713 and or shaft 718.

In exemplary embodiments, coupling component 714 may comprise of an elongated arm that sits perpendicular to rotating arm 707. Moreover, in exemplary embodiments, the elongated arm of coupling component 714 further includes a shape suitable for guiding a coupling component of a drone assembly or drone attachment in accordance with the present invention. For example, and without limiting the scope of the present invention, where docking station 700 is configured to register with drone attachment 500, the elongated arm of coupling component 714 may comprise a cross-section that guides coupling post 510 and more specifically registers with the conical tip 511 so as to facilitate proper positioning or coupling of the drone attachment 500 components and the docking station 700 components to ensure, as mentioned above, that as motor 507 drives or turns coupling arm 508, coupling component 714 is engaged and rotates as well to turn gears 709, 710, 711, and 712 actuate shaft 713 and or shaft 718. In some exemplary components, a cross-section of coupling component 714 is a pointed cross-section or a cross-section that having a larger base than top surface such as a triangular or substantially triangular cross-section.

In exemplary embodiments, gears 709, 710, 711, and 712 may comprise self-locking worm gears to prevent external forces such as strong winds from turning the panels. In exemplary embodiments, gears 709, 710, 711, and 712 are configured for high gear ratios to minimize a required torque from the drone assembly motors. Implementation of sufficiently strong worm-gears may have the added benefit to, for example and in addition to weather tolerance, allow the panel(s) attached to docking station 700 to be of a no-stow design, meaning that they do not have to be "put away for the winter" or in otherwise stored in some manner during an off-season.

Securing the various gears 709, 710, 711, and 712 and shaft 713 to the interior or cavity 704 of docking station 700, may be achieved by implementing with the frame of docking station 700 (i.e. side walls 702, top surface 701 and bottom support plate 703) support plates 716 configured to rotatably receive portions of the same so that each component is rotatably secured to said frame. In the shown exemplary embodiment, support plates 716 are coupled externally to the frame. In some exemplary embodiments, support plates 716 may be configured to receive a handle or other mechanism that facilitates manual or hand-operated movement of the one or more solar panels coupled to docking station 700. For example, and without deviating from or limiting the scope of the present invention, it may be desirable for certain installations—whether for emergencies, during maintenance services, for making periodic adjustments that may be required as the altitude of the sun changes throughout the year, or for any other reason—to facilitate a manual operation of the gearbox within docking station 700 in case operation with a drone assembly is undesirable or unavailable.

Securing docking station 700 in the field may be achieved with any support means such as a stand 717, which may help elevate docking station 700 to a desired height suitable for coupling with the one or more solar plates and for facilitating a landing and taking off procedure for the drone assemblies. In exemplary embodiments, docking station 700 may be rotably coupled to and secured to stand 717 by way of a rotatable support rod or shaft 718, which may be inserted into a portion of stand 717 and rotably secured therein with a fastener that may traverse support rod 718 such as via an aperture 719, also held in place by a brace 720 that may be implemented at a top section of stand 717. Because shaft 718 is rotably coupled to stand 717 when one of the rotating arms 707 is actuated by a drone assembly, such as drone assembly 500, docking station 700 may rotate about a longitudinal axis of the docking station 700.

As should be apparent to a person of ordinary skill in the art, some of the specific structures described above are not exhaustive, and other structures and configurations of the components of a docking station and or a drone attachment may be conceived without deviating from the scope of the present invention. For example, the number of landing posts and their length and shapes only matter insofar as components of a drone assembly register or are configured to engage with certain components of a docking station in accordance with the present invention. Accordingly, other embodiments of drone attachments and docking stations may include different coupling mechanisms, different shapes, sizes, and cross-sections and yet be in accordance with the scope of the present invention.

Turning now to the next figure, a method for implementing a system in accordance with exemplary embodiments of the present invention is discussed. More specifically, FIG. 8 depicts method 800 for positioning solar panels with automated drones. Although method 800 is exemplarily shown with a series of steps in one particular sequence, method 800 may include fewer or more steps in alternative sequences without deviating from the scope of the present invention.

In step 801, a solar farm operator, installer, administrator or service provider, may distribute throughout the field a plurality of docking stations in accordance with the present invention.

In step 802, each of the plurality of docking stations may be coupled to a set of solar panels, wherein a set of solar panels may include one or more solar panels in the field. As mentioned above, each docking station should be mechanically coupled to one or more solar panels so that actuating a gearbox of the docking station rotates or otherwise moves or adjusts a position of the solar panel.

In step 803, a plurality of docking bays may be distributed throughout the field. For example, and without deviating from the scope of the present invention, a docking bay for housing a single drone assembly may be distributed for a certain number of solar panels in the field suitable for service by the drone assembly. This step may include further providing a deployable enclosure or storage container suitable for housing the drone and providing certain maintenance. Thus, this step may require, as explained above, linking a communications module, charging station, battery swapping modules, etc. to each drone docking bay, as well as distributing and setting up other auxiliary components throughout the field, including but not limited to setting up sensors, access points and linking each device to a shared network that preferable is maintained via a centralized server.

In step 804, drones may be assigned to different docking stations and associated with different scheduled tasks for flights to be completed throughout the solar farm.

In step 805, drone assemblies may be deployed to fly at scheduled times from their docking bay to one or more docking stations whenever adjustment of a position of one or more solar panels is required. With adequate programming and monitoring of the system, the drones will autonomously adjust solar panels to a desired position at the scheduled times.

Now with reference to FIG. 9, a flow chart of one method for adjusting a solar panel position in accordance with exemplary embodiments of the present invention is presented. More specifically, FIG. 9 depicts method 900, performed by an autonomous drone assembly in accordance with the present invention. Although method 900 is exemplarily shown with a series of steps in one particular sequence, method 900 may include fewer or more steps in alternative sequences without deviating from the scope of the present invention.

In step 901, a drone assembly may execute a flight routine to fly from a docking bay (or deployable enclosure) to one or more remote docking stations in the solar farm, wherein the docking stations are mechanically coupled to one or more solar panels. This step may require the programmable drone to find a location of the docking station in its itinerary or list of assignments for the scheduled period. In exemplary embodiments, this may be performed using GPS services as well as identification of unique codes that may be placed for the drone to recognize while in flight. For example, and without deviating from the scope of the present invention, a drone assembly may utilize an onboard camera to recognize a QR™ code prominently affixed to a stand or viewable surface of the target docking station. In either event, once a target docking station is recognized, a landing routine may be initiated as in the following two steps.

In step 902, the drone assembly descends from flight and lands on a platform of a docking station coupled to one or more solar panels that are desirably adjusted at that particular time of the day for maximizing a solar energy uptake by the photovoltaic cells contained in each panel.

In step 903, the drone assembly may secure itself to the platform—which typically occurs as the drone assembly successfully lands on the platform in accordance with the embodiments described above. This step typically requires the components of the drone assembly or components of a drone attachment of the drone assembly, to register with components of the docking station. This secured coupling ensures that a gearbox of the docking station will be properly actuated with the drone assembly drives a set of one or more motors to turn the same.

In step 905, the drone may drive the motors for a predetermined period of time in order to turn the gearbox of the docking station and move the solar panels to a suitable position. Once this step is complete, a drone may initiate a take-off routine and either return to its docking bay (or deployable cover) or move on to its next scheduled docking station for adjusting a new set of solar panels.

Figure 10A:
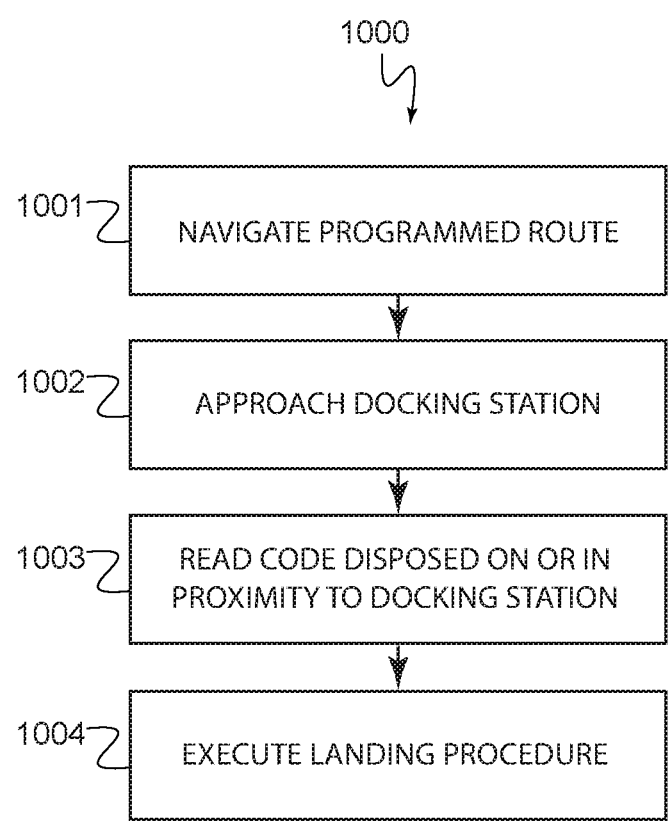
FIG. 10A illustrates a flow chart of an exemplary method for navigating to a docking station in order to adjust a solar panel in accordance with exemplary embodiments of the present invention.

Now with reference to FIG. 10A, a flow chart of an exemplary method for navigating to a docking station in order to adjust a solar panel in accordance with exemplary embodiments of the present invention is presented. More specifically, FIG. 10A depicts method 1000, performed by an autonomous drone assembly in accordance with the present invention. Although method 1000 is exemplarily shown with a series of steps in one particular sequence, method 1000 may include fewer or more steps in alternative sequences without deviating from the scope of the present invention.

In step 1001, a drone assembly in accordance with the present invention may use onboard GPS to navigate a pre-planned or programmed route (e.g. panel A to panel B to panel C, etc.). The programmed route and the GPS position of each panel and docking station may be be stored in a server in accordance with the present invention, and typically automatically computed for optimal efficiency In step 1002, the drone assembly may primarily navigate to the GPS latitude/longitude of one or more solar panels coupled to a docking station. This may include, without limiting the scope of the present invention, approaching or hovering above a platform of the docking station. In exemplary embodiments, programmable instructions keep the drone assembly hovering at a predetermined distance and or for a predetermined period.

In step 1003, using a camera of the drone assembly, the drone assembly may read a two-dimensional barcode matrix, for example a QR™ code, that is in proximity to or disposed on a surface of the docking station, one or more solar panels, or on a surface of any structural support thereof.

In step 1004, having read and successfully identified the docking station and or one or more solar panels, the drone assembly will then execute a landing procedure.

Figure 10B:
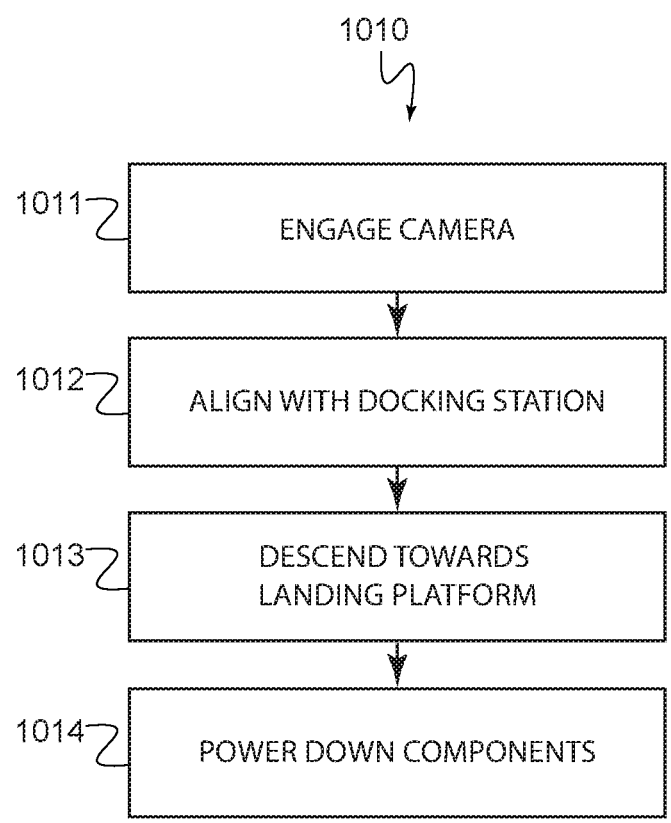
FIG. 10B illustrates a flow chart of an exemplary method for executing a landing procedure on a platform of a docking station in order to adjust a solar panel in accordance with exemplary embodiments of the present invention.

Now with reference to FIG. 10B, a flow chart of an exemplary method for executing a landing procedure on a platform of a docking station in order to adjust a solar panel in accordance with exemplary embodiments of the present invention is presented. More specifically, FIG. 10B depicts method 1010, performed by an autonomous drone assembly in accordance with the present invention. Although method 1010 is exemplarily shown with a series of steps in one particular sequence, method 1010 may include fewer or more steps in alternative sequences without deviating from the scope of the present invention.

In step 1011, the drone assembly (having recognized and or identified the target docking station) may utilize or engage a camera, such as a stereo camera. In exemplar embodiments, in this step, the drone assembly may use executable instructions including dimensions of the drone and landing surface or platform of the docking station, in order to guide the landing approach of the drone assembly onto the platform of the docking station.

In step 1012, the drone assembly may initially align itself correctly with the panel, using an orientation provided by the QR™ code.

In step 1013, the drone assembly may gradually descend, using feedback from the stereo camera to make adjustments and thus establish a docking condition wherein the drone assembly engages with components of the docking station as mentioned above in order to secure itself to the platform of the docking station.

In step 1014, once the docking condition has been established and the drone assembly is secured to the docking station, the drone assembly may power down one or more components such as any aerial drone fans and cameras to conserve power and maintain a stable docking with the docking station, in order to execute a solar panel adjustment procedure.

In exemplary embodiments, after successfully executing a landing routine or procedure, whereby the drone assembly lands and is secured to a docking station, a solar panel adjustment or positioning procedure may be initiated described in the following method below.

Figure 10C:
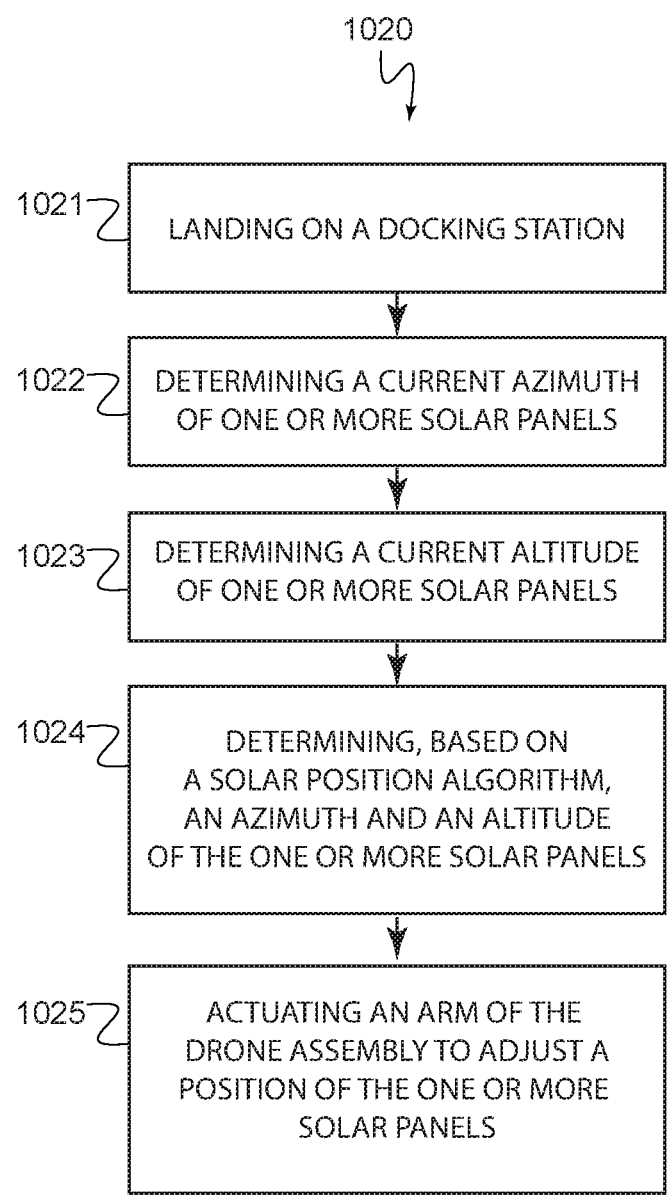
FIG. 10C illustrates a flow chart of an exemplary method for adjusting a solar panel position in accordance with exemplary embodiments of the present invention.

Now with reference to FIG. 10C, a flow chart of an exemplary method for adjusting a solar panel position in accordance with exemplary embodiments of the present invention is presented. More specifically, FIG. 10C depicts method 1020, performed by an autonomous drone assembly in accordance with the present invention. Although method 1020 is exemplarily shown with a series of steps in one particular sequence, method 1020 may include fewer or more steps in alternative sequences without deviating from the scope of the present invention.

In step 1021, the drone assembly typically executes a landing routine or procedure, for example and without limiting the scope of the present invention, as described above with reference to method 1010.

In step 1022, after successfully executing a landing routine or procedure, whereby the drone assembly lands and is secured to a docking station, the drone assembly may determine a current azimuth of one or more solar panels coupled to the docking station wherein an orientation of the solar panels coincides with an orientation of the docking station such that the drone can determine the same from its own position. For example, and without limiting or deviating from the scope of the present invention, the docking station may be mechanically coupled to one or more solar panels in a manner such that a forward-facing orientation of the docking station coincides with a forward-facing orientation of a solar panel coupled to the docking station. As such, a position along the azimuth of the solar panel will coincide with a position of the docking station; because the drone assembly may be docked to the docking station in a predetermined orientation, the drone assembly will be able to determine its own position as well as the position of the solar panel along its azimuth at that current time. In exemplary embodiments, the drone assembly may use an onboard compass and GPS to determine its own position and thus current azimuth of the solar panel coupled to the docking station.

In step 1023, the drone assembly may determine a current altitude of the one or more solar panels coupled to the docking station. In exemplary embodiments, the drone assembly may use an onboard camera for obtaining a current altitude.

In step 1024, the drone assembly may determine a desired azimuth and a desired altitude for the solar panels. In exemplary embodiments, a solar position algorithm may be employed to calculate the solar zenith and azimuth angle. With this information, the drone assembly may be configured to obtain the desired azimuth and the desired altitude for the solar panels coupled to the docking station.

In step 1025, having determined the desired altitude for the solar panels coupled to the docking station, the drone assembly may actuate an arm of the drone assembly to adjust the solar panels according to the determined azimuth and altitude for the solar panels.

Now with reference to FIG. 11, a flow chart of one method for managing a system in accordance with exemplary embodiments of the present invention is discussed. More specifically, FIG. 11 depicts method 1100, performed by a system configured autonomously adjust solar panels with automated drones. Although method 1100 is exemplarily shown with a series of steps in one particular sequence, method 1100 may include fewer or more steps in alternative sequences without deviating from the scope of the present invention.

In steps 1101-1104, various components of an exemplary system may be registered with the system's database, such as for example, registering solar panels to be adjusted via autonomous means, adding new or reactivated solar panels, etc. Similarly, registering information about components such as GPS locations of panels, registering QR™ codes and associating the same with docking stations may be added to the system's database. Drone assemblies and docking stations, sensors and access points may be registered in these steps.

In step 1105, flight assignments for drone assemblies may be scheduled and or programmed. Similarly, in step 1106, certain rules or policies may be designated, enabled or disabled. For example, and without limiting the scope of the present invention, flight hours and restrictions may be set for a given period of time, depending on daylight availability, weather, etc. In step 1107, system status monitoring may be performed.

It is envisioned that a system and method in accordance with the present invention will autonomously positions solar panels to maximize solar exposure. It is poised that such system is easy to install and does away with complex panel positioning systems common in the art. The autonomous nature of the system is designed to increase efficiency, and system components include easily retrofittable elements that may be easily adapted by existing solar farms. It is further poised that because of the mobility of each drone assembly, terrain on the solar farm does not require attention to costly preparatory procedures such as leveling prior to panel installation. Drone assemblies in accordance with the present invention may be efficiently implemented in numbers so that if a drone fails, backup drones may be deployed automatically, reducing downtime. Similarly, due to their mechanical simplicity, the solar panels themselves are easy to repair or replace. Overall, lower installation and maintenance cost in the long run is achieved compared to other tracking systems.

A system and method for drone automated positioning of solar panels has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching. It is intended that the scope of the invention not be limited by this detailed description, but by the claims and the equivalents to the claims.

What is claimed is:

1. A system for controlling a position of one or more solar panels, comprising:
    a docking station including a landing platform having one or more docking posts, one or more gearbox arms protruding through a top surface of the landing platform, and a gearbox mechanically coupled to one or more solar panels, wherein the one or more gearbox arms are mechanically coupled to the gearbox; and
    an aerial drone assembly including:
        one or more landing posts secured to a frame, wherein at least one of the one or more landing posts is configured to register with the docking station;
        one or more arms coupled to one or more motors secured to the frame, the one or more arms configured to actuate the gearbox of the docking station via the one or more gearbox arms; and
        a control circuitry for supplying power to the one or more motors, the control circuitry configured to:
            fly the aerial drone assembly to the docking station;
            land the aerial drone assembly on the landing platform of the docking station such that at least one of the one or more landing posts registers with at least one of the one or more docking posts of the docking station and the one or more arms engage with the one or more gearbox arms of the gearbox mechanically coupled to the one or more solar panels; and
            adjust a position of the one or more solar panels by actuating the one or more arms to actuate the one or more gearbox arms.

2. The system of claim 1, wherein the gearbox of the docking station includes a shaft traversing opposite side walls of the docking station, the shaft rotatably coupled to a portion of the one or more solar panels.

3. The system of claim 1, wherein at least one of the one or more docking posts includes a guiding tip configured to register inside a cavity of one of the landing posts of the aerial drone assembly.

4. The system of claim 1, wherein the gearbox arm comprises a cross-section configured to guide the one or more arms of the aerial drone assembly.

5. The system of claim 1, further comprising:
    a server configured to issue commands, associated with adjusting the position of the one or more solar panels, to the aerial drone assembly via a wireless network, wherein the aerial drone assembly further includes a transceiver.

6. The system of claim 1, further comprising:
    a deployable enclosure including a communications module configured to communicate with a server and the aerial drone assembly.

7. The system of claim 1, wherein the control circuitry is further configured to:
    capture data comprised of measurements and relative position information by use of a camera of the aerial drone assembly;
    upload the data, to a server having a software module capable of performing operations on the data, by use of a communications module of the aerial drone assembly;
    obtain from the server a current azimuth and a current altitude of the one or more solar panels coupled to the docking station;
    determine, based on a solar position algorithm, an optimum azimuth and altitude of the one or more solar panels; and
    adjust the position of the one or more solar panels to the optimum azimuth and altitude.

8. The system of claim 1, wherein the control circuitry is further configured to:
    engage an on-board camera to guide a landing approach of the aerial drone assembly onto the platform of the docking station; and
    prior to adjusting the position of the one or more solar panels, power down one or more fans of the aerial drone assembly to conserve power and maintain a stable docking with the docking station.

9. The system of claim 1, wherein the control circuitry is further configured to:
    prior to landing the aerial drone assembly on the platform of the docking station, identify the docking station by recognizing a matrix barcode using an onboard camera coupled to the control circuitry.

10. The system of claim 1, wherein at least one of the one or more landing posts of the aerial drone assembly includes a cavity along a length of the landing post that widens at a receptacle base of the landing post, the receptacle base configured to increase error tolerance when registering with a docking post of the docking station.

11. The system of claim 1, wherein at least one of the one or more arms of the aerial drone assembly includes a coupling post with a guiding tip configured to improve error tolerance when engaging with the one or more gearbox arms of the docking station.

12. A method for controlling a position of a one or more solar panels with automated aerial drone assemblies, comprising:
  flying a drone assembly from a docking bay to a remote docking station mechanically coupled to the one or more solar panels by a gearbox of the docking station, the drone assembly including: one or more landing posts secured to a frame, and one or more arms coupled to one or more motors secured to the frame, wherein at least one of the one or more landing posts is configured to register with the docking station and the one or more arms are configured to actuate the gearbox of the docking station via one or more gearbox arms mechanically coupled to the gearbox;
  landing the aerial drone assembly on a landing platform of the docking station such that at least one of the one or more landing posts registers with at least one of the one or more docking posts of the docking station and the one or more arms engage with the one or more gearbox arms protruding through a top surface of the landing platform of the docking station; and
  adjusting a position of the one or more solar panels by actuating the one or more arms of the aerial drone assembly to actuate the one or more gearbox arms to operate the gearbox.

13. The method of claim 12, wherein adjusting the position of the one or more solar panels, includes:
  determining a current azimuth and a current altitude of the one or more solar panels coupled to the docking station;
  determining, based on a solar position algorithm, an optimum azimuth and altitude of the one or more solar panels; and
  adjusting the position of the one or more solar panels to the optimum azimuth and altitude.

14. The method of claim 13, wherein landing the aerial drone assembly on the landing platform of the docking station, includes:
  identifying the docking station by recognizing a matrix barcode using an onboard camera coupled to the control circuitry;
  engaging the on-board camera to guide a landing approach of the aerial drone assembly onto the platform of the docking station; and
  prior to adjusting the position of the one or more solar panels, powering down one or more fans of the aerial drone assembly to conserve power and maintain a stable docking with the docking station.

* * * * *